US011066934B1

(12) United States Patent
Stein et al.

(10) Patent No.: US 11,066,934 B1
(45) Date of Patent: Jul. 20, 2021

(54) TURBINE ROTOR BLADE AIRFOIL PROFILE

(71) Applicant: General Electric Company, Schenectady, NY (US)

(72) Inventors: Alexander Stein, Simpsonville, SC (US); Mark Steven Honkomp, Taylors, SC (US); Mehmet Suleyman Ciray, Simpsonville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 16/824,977

(22) Filed: Mar. 20, 2020

(51) Int. Cl.
*F01D 5/12* (2006.01)

(52) U.S. Cl.
CPC ............ *F01D 5/12* (2013.01); *F05D 2250/74* (2013.01)

(58) Field of Classification Search
CPC ........... F01D 5/12; F01D 5/14; F05D 2250/74
See application file for complete search history.

(56) References Cited

U.S. PATENT DOCUMENTS

| | | | |
|---|---|---|---|
| 6,461,110 B1 * | 10/2002 | By | F01D 5/141 415/191 |
| 6,685,434 B1 | 2/2004 | Humanchuk et al. | |
| 6,739,838 B1 | 5/2004 | Bielek et al. | |
| 6,779,980 B1 | 8/2004 | Brittingham et al. | |
| 7,467,920 B2 * | 12/2008 | Sullivan | F01D 5/141 415/191 |
| 7,731,483 B2 | 6/2010 | DeLong et al. | |
| 8,894,376 B2 | 11/2014 | Penny et al. | |
| 9,638,041 B2 | 5/2017 | Brozyna et al. | |
| 1,019,041 A1 | 1/2019 | Brozyna et al. | |
| 1,024,700 A1 | 4/2019 | Ristau et al. | |

* cited by examiner

*Primary Examiner* — Eldon T Brockman
(74) *Attorney, Agent, or Firm* — Dority & Manning, P.A.

(57) ABSTRACT

The present application provides a turbine rotor blade including an airfoil shape and a trailing edge shape. The airfoil shape may have a nominal profile substantially in accordance with Cartesian coordinate values of X, Y and Z set forth in Table I, while the trailing edge profile is defined by Table II. The Cartesian coordinate values of X, Y and Z are non-dimensional values from 0% to 100% convertible to dimensional distances in a unit of distance by multiplying the Cartesian coordinate values of X, Y and Z by a height of the airfoil in the unit of distance (e.g., inches). The X and Y values, when connected by smooth continuing arcs, define airfoil profile sections at each distance Z. The airfoil profile sections at Z distances may be joined smoothly with one another to form a complete airfoil shape.

19 Claims, 3 Drawing Sheets

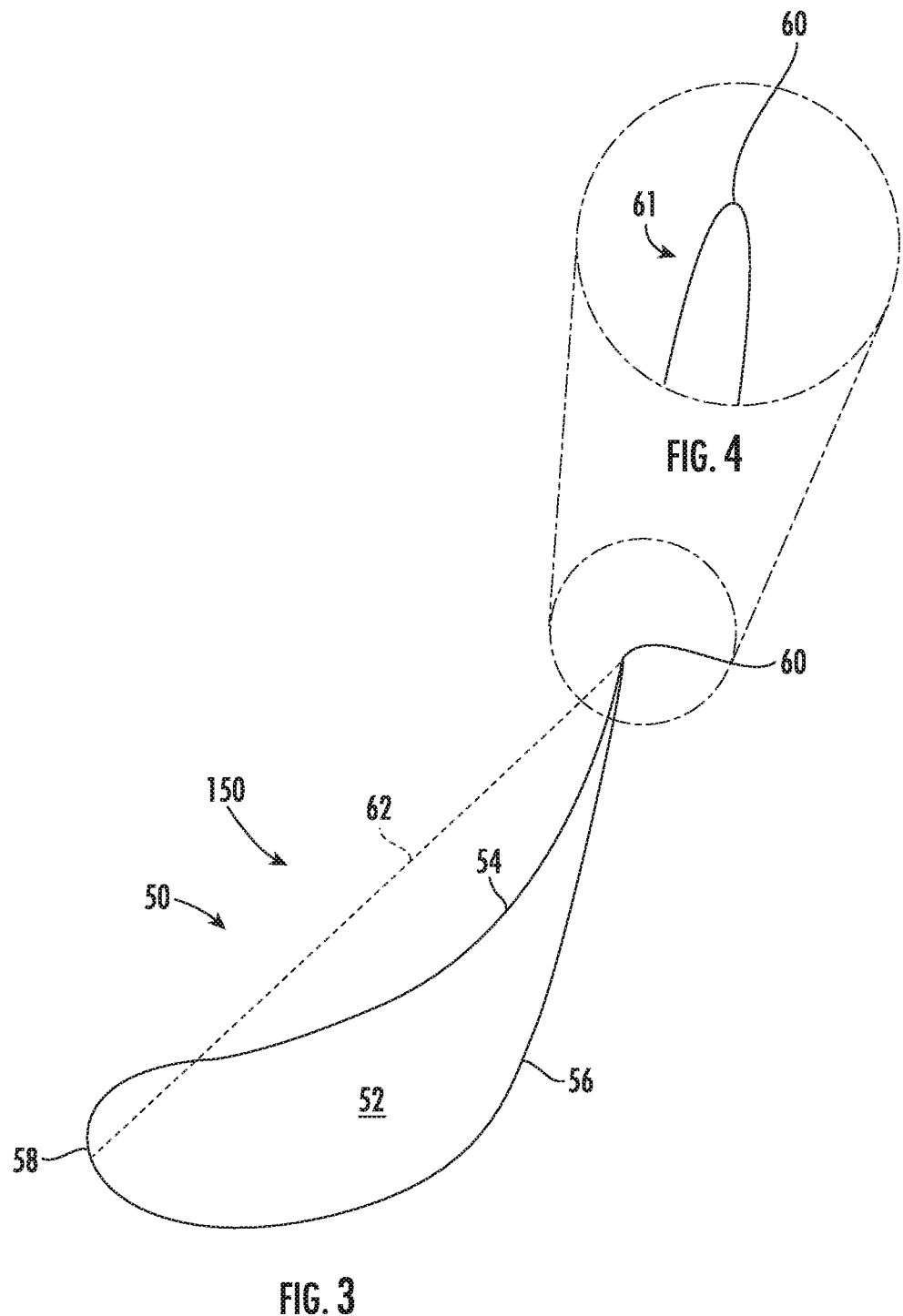

TURBINE ROTOR BLADE AIRFOIL PROFILE

FIELD

The present disclosure relates to an airfoil for a turbine rotor blade of a stage of a turbine and, more particularly, to a shape defining a profile for an airfoil of a turbine rotor blade.

BACKGROUND

Some jet aircraft and simple cycle or combined cycle power plant systems employ turbines, or so-called turbomachines, in their design and operation. Some of these turbines employ airfoils (e.g., stator vanes or nozzles and rotor blades), which during operation are exposed to fluid flows. These airfoils are configured to aerodynamically interact with the fluid flows and to generate energy from these fluid flows as part of power generation. For example, the airfoils may be used to create thrust, to convert kinetic energy to mechanical energy, and/or to convert thermal energy to mechanical energy. As a result of this interaction and conversion, the aerodynamic characteristics of these airfoils may result in losses that have an impact on system and turbine operation, performance, thrust, efficiency, and power.

BRIEF DESCRIPTION

Aspects and advantages of the turbine rotor blades in accordance with the present disclosure will be set forth in part in the following description, or may be obvious from the description, or may be learned through practice of the technology.

In accordance with one embodiment, the present application provides a turbine rotor blade including an airfoil shape. The airfoil shape may have a nominal profile substantially in accordance with Cartesian coordinate values of X, Y and Z set forth in Table I. The Cartesian coordinate values of X, Y and Z are non-dimensional values from 0% to 100% convertible to dimensional distances expressed in a unit of distance by multiplying the Cartesian coordinate values of X, Y and Z by a height of the airfoil in the unit of distance. The X and Y values, when connected by smooth continuing arcs, define airfoil profile sections at each Z value. The airfoil profile sections at Z values may be joined smoothly with one another to form a complete airfoil shape.

In accordance with another embodiment, the present application provides a turbine rotor blade including an airfoil having a uncoated nominal suction-side profile substantially in accordance with suction-side Cartesian coordinate values of X, Y and Z set forth in Table I. The Cartesian coordinate values of X, Y and Z are non-dimensional values from 0% to 100% convertible to dimensional distances expressed in a unit of distance by multiplying the Cartesian coordinate values of X, Y and Z by a height of the airfoil in the unit of distance. The X and Y values, when connected by smooth continuing arcs, define suction-side profile sections at each Z value. The suction-side profile sections at the Z values may be joined smoothly with one another to form a complete (uncoated) suction-side nominal shape.

In accordance with another embodiment, the present application provides a turbine rotor blade that includes an airfoil having a uncoated nominal trailing edge profile substantially in accordance with Cartesian coordinate values of X, Y and Z set forth in Table II. The Cartesian coordinate values of X, Y and Z are non-dimensional values from 0% to 100% convertible to dimensional distances expressed in a unit of distance by multiplying the Cartesian coordinate values of X, Y and Z by a height of the airfoil in the unit of distance. The X and Y values, when connected by smooth continuing arcs, define trailing edge profile sections at each Z value. The trailing edge profile sections at the Z values may be joined smoothly with one another to form a complete airfoil trailing edge shape.

These and other features, aspects and advantages of the present turbine rotor blades will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present turbine rotor blades, including the best mode of making and using the present systems and methods, directed to one of ordinary skill in the art, is set forth in the specification, which makes reference to the appended figures, in which:

FIG. 3 provides a cross-sectional view of an airfoil portion of the turbine rotor blade of FIG. 2; and FIG. 4 is an enlarged view of a trailing edge of the airfoil portion shown in FIG. 3.

DETAILED DESCRIPTION

Figure 1:
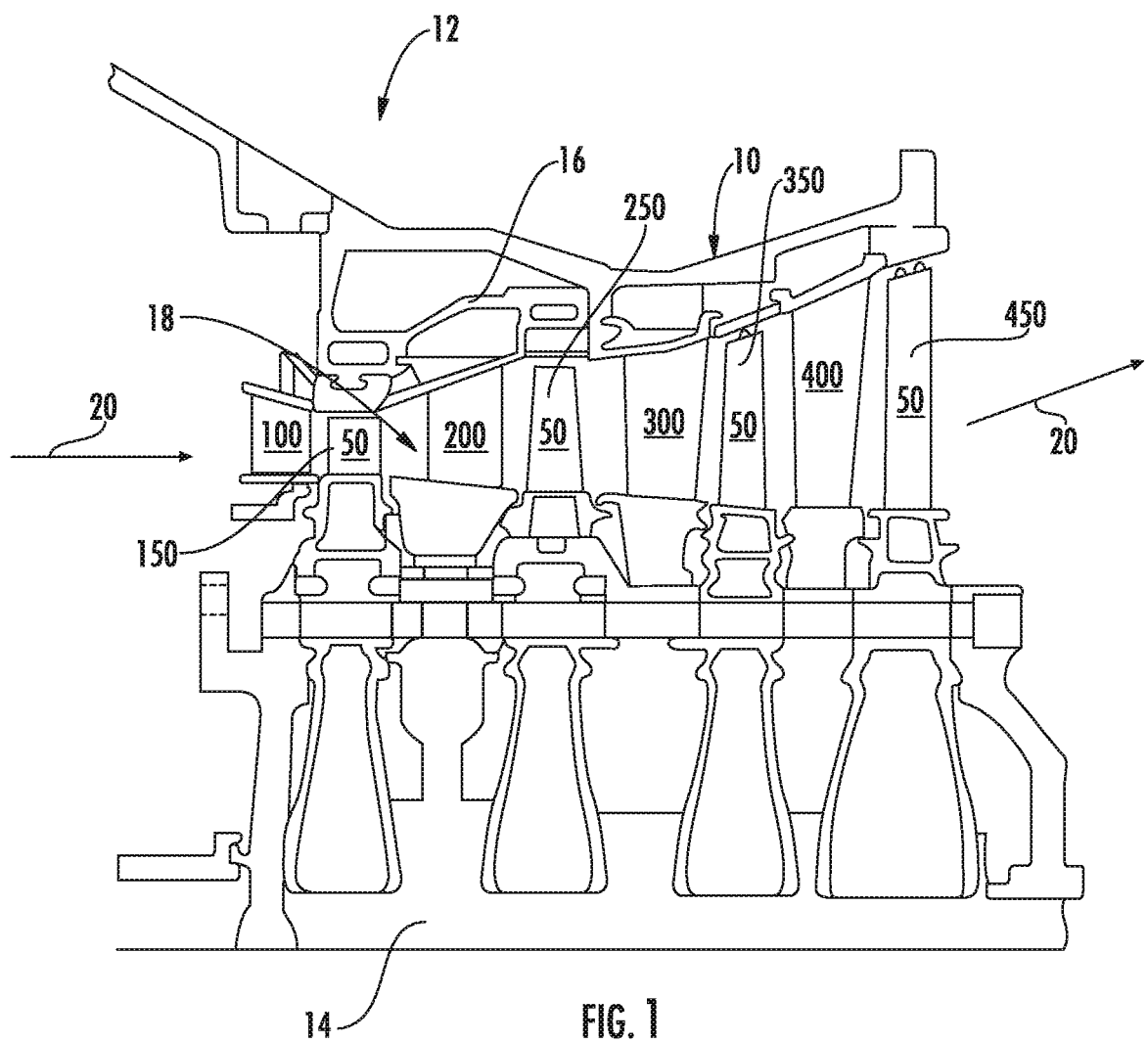
FIG. 1 is a schematic representation of an exemplary turbine having multiple stages with each stage including alternating rows of turbine rotor blades and stationary vanes or nozzles, according to at least one embodiment of the present disclosure.

Reference now will be made in detail to embodiments of the turbine rotor blades, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows.

It is sometimes necessary to describe parts that are disposed at differing radial positions with regard to a center axis. The term "radially" refers to the relative direction (i.e., movement or position) that is substantially perpendicular to an axial centerline of a particular component; the term "axially" refers to the relative direction (i.e., movement or position) that is substantially parallel and/or coaxially aligned to an axial centerline of a particular component; and the term "circumferentially" refers to the relative direction that extends around the axial centerline of a particular component.

Unless stated otherwise, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the drawings, particularly to FIG. 1, an exemplary turbine 10 of a gas turbine 12 includes a plurality of turbine stages arranged in serial flow order. Each stage of the turbine includes a row of stationary turbine nozzles or vanes (e.g., nozzles 100) disposed axially adjacent to a corresponding rotating row of turbine rotor blades 50. Four stages are illustrated in FIG. 1. The exact number of stages of the turbine 10 is a choice of engineering design and may be more or less than the four stages illustrated in FIG. 1. The four stages are merely exemplary of one turbine design and are not intended to limit the presently claimed turbine rotor blade in any manner.

The first stage comprises a plurality of turbine nozzles or vanes 100 and a plurality of turbine rotor blades 150. The turbine nozzles 100 are mounted to a casing 16 of the turbine 12 and are annularly arranged about an axis of a turbine rotor 14. The turbine rotor blades 150 are annularly arranged about and coupled to the turbine rotor 14. A second stage of the turbine 12 includes a plurality of turbine nozzles 200 annularly arranged about the axis of the turbine rotor 14 and a plurality of turbine rotor blades 250 annularly arranged about and coupled to the turbine rotor 14. The turbine nozzles 200 may be coupled to the casing 16 of the turbine 12.

As shown in FIG. 1, a third stage of the turbine 12 includes a plurality of turbine nozzles 300 annularly arranged about the axis of the turbine rotor 14 and a plurality of turbine rotor blades 350 annularly arranged about and coupled to the turbine rotor 14. The turbine nozzles 300 may be coupled to the casing 16 of the turbine 12. In particular embodiments, the turbine 12 includes a fourth stage, which includes a plurality of turbine nozzles 400 annularly arranged about the axis of the turbine rotor 14 and a plurality of turbine rotor blades 450 annularly arranged about and coupled to the turbine rotor 14. The fourth stage turbine nozzles 400 may be coupled to the casing 16 of the turbine 12.

It will be appreciated that the turbine nozzles 100, 200, 300 and 400 and turbine rotor blades 150, 250, 350 and 450 are disposed or at least partially disposed within a hot gas path 18 of the turbine 12. The various stages of the turbine 10 at least partially define the hot gas path 18 through which combustion gases, as indicated by arrows 20, flow during operation of the gas turbine 12.

Figure 2:
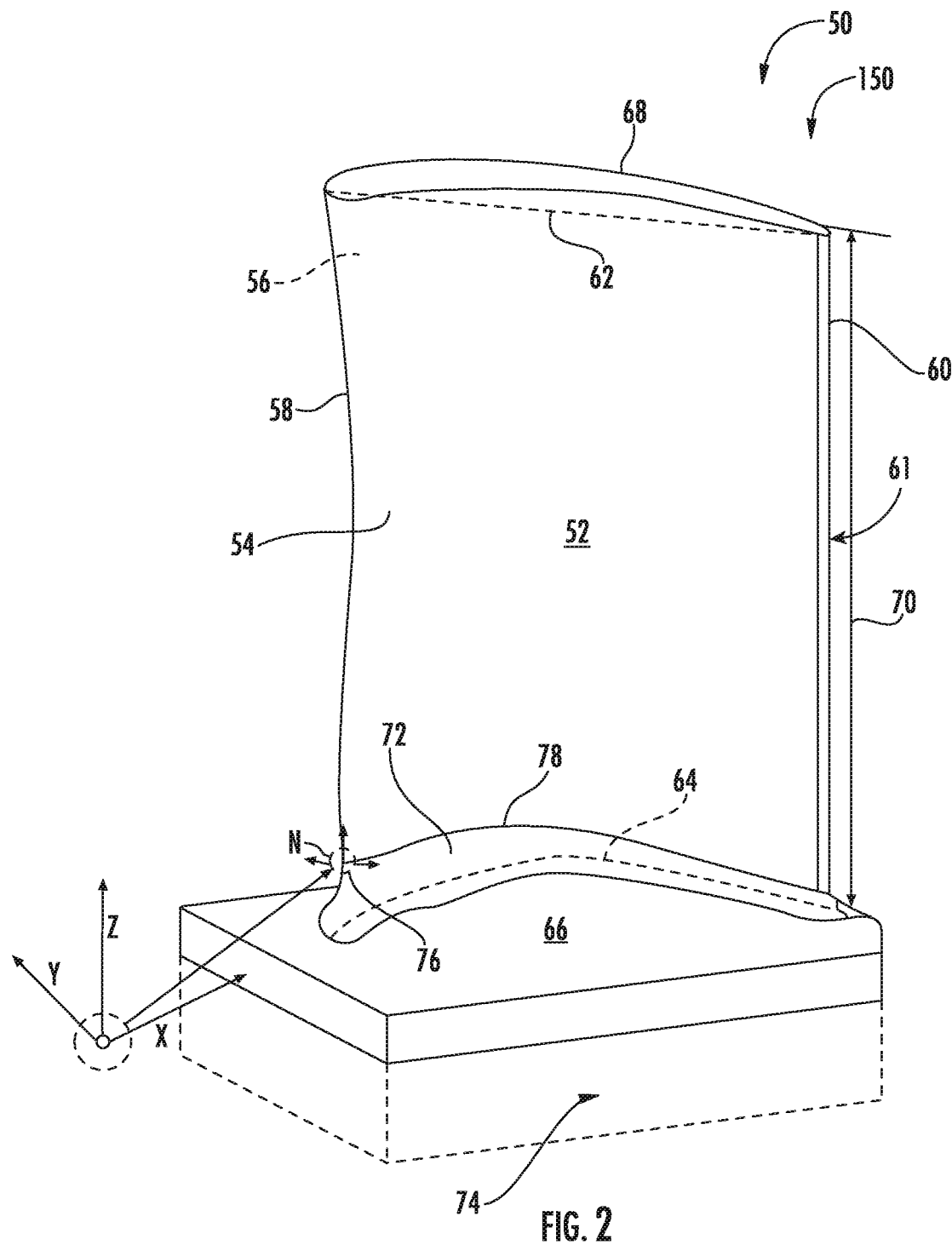
FIG. 2 is a perspective view of a turbine rotor blade, according to at least one embodiment of the present disclosure.

FIG. 2 provides a perspective view of an exemplary turbine rotor blade 50 as may be incorporated in any stage of the turbine 12. For example, in one embodiment the turbine rotor blade 50 as presented in Table I below is representative of a turbine rotor blade 150 of the plurality of turbine rotor blades 150 of the first stage.

As shown in FIGS. 2 and 3 collectively, the turbine rotor blade 50 includes an airfoil 52 having a pressure-side wall 54 and an opposing suction-side wall 56. The pressure-side wall 54 and the suction-side wall 56 meet or intersect at a leading edge 58 and a trailing edge 60 of the airfoil 52. A chord line 62 extends between the leading edge 58 and the trailing edge 60 such that pressure and suction-side walls 54, 56 can be said to extend in chord or chordwise between the leading edge 58 and the trailing edge 60.

As shown in FIG. 2, the airfoil 52 includes a root or first end 64, which intersects with and extends radially outwardly from a base or platform 66 of the turbine rotor blade 50. The airfoil 52 terminates radially at a second end or radial tip 68 of the airfoil 52. The pressure-side and suction-side walls 54, 56 can be said to extend in span or in a span-wise direction 70 between the root 64 and/or the platform 66 and the radial tip 68 of the airfoil 52. In other words, each turbine rotor blade 50 includes an airfoil 52 having opposing pressure-side and suction-side walls 54, 56 that extend in chord or chordwise 62 between opposing leading and trailing edges 58, 60 and that extend in span or span-wise 70 between the root 64 and the radial tip 68 of the airfoil 52.

In particular configurations, the airfoil 52 may include a fillet 72 formed between the platform 66 and the airfoil 52 proximate to the root 64. The fillet 72 can include a weld or braze fillet, which can be formed via conventional MIG welding, TIG welding, brazing, etc., and can include a profile that can reduce fluid dynamic losses as a result of the presence of fillet 72. In particular embodiments, the platform 66, the airfoil 52 and the fillet 72 can be formed as a single component, such as by casting and/or machining and/or 3D printing and/or any other suitable technique now known or later developed and/or discovered. In particular configurations, the turbine rotor blade 50 includes a mounting portion 74 (such as a dovetail joint), which is formed to connect and/or to secure the turbine rotor blade 50 to the rotor shaft 14.

The airfoil 52 of the turbine rotor blade 50 has a nominal profile at any cross-section taken between the platform 66 or the root 64 and the radial tip 68, e.g., the cross section shown in FIG. 3. As shown in FIG. 4, the airfoil 52 may further define a trailing edge profile 61 proximate the trailing edge 60. For example, in one embodiment, Table II below is representative of the trailing edge profile 61 for a turbine rotor blade 150 of the plurality of turbine rotor blades 150. A "profile" is the range of variation between measured points on an airfoil surface and the ideal position listed in Table I or Table II. The actual profile on a manufactured turbine blade will be different from those in Table I or Table II (e.g., due to coatings), and the design is robust to this variation, meaning that mechanical and aerodynamic function are not impaired.

The X, Y, and Z values are given in Table I and Table II as percentage values of the airfoil height or span, as measured in any given unit of distance (e.g., inches). As one example only, the height or radial span of the airfoil 52 of turbine rotor blade 50 may be from about 1 inch to about 10 inches (about 2.5 centimeters to about 25 centimeters) or from about 5 inches to about 10 inches (about 12.5 centimeters to about 25 centimeters) or from about 7 inches to about 10 inches (about 17.5 centimeters to about 25 centimeters). However, it is to be understood that heights below or above this range may also be employed as desired in the specific application.

A gas turbine hot gas path requires airfoils that meet system requirements of aerodynamic and mechanical blade loading and efficiency. To define the airfoil shape of each turbine rotor blade airfoil, there is a unique set or loci of points in space that meet the stage requirements and that can be manufactured. This unique loci of points meet the requirements for stage efficiency and are arrived at by iteration between aerodynamic and mechanical loadings, enabling the turbine to run in an efficient, safe and smooth manner. These points are unique and specific to the system.

The loci that define the turbine rotor blade airfoil profile include a set of about 2,400 points with X, Y and Z dimensions relative to a reference origin coordinate system. The Cartesian coordinate system of X, Y and Z values given in Table I below defines the profile of the turbine rotor blade airfoil at various locations along its height. Similarly, the loci that define the turbine rotor blade trailing edge profile include a set of about 700 points with X, Y, and Z dimensions relative to a reference origin coordinate system. The Cartesian coordinate system of X, Y and Z values given in Table II below defines the profile of the trailing edge of the turbine rotor blade airfoil at various locations along its height.

Table I and Table II list data for a uncoated airfoil at cold or room temperature. The envelope/tolerance for the coordinates is about +/−5% in a direction normal to any airfoil surface location and/or about +/−5% of the chord 62 in a direction nominal to any airfoil surface location. In other words, the airfoil layout, as embodied by the disclosure, is robust to this range of variation without impairment of mechanical and aerodynamic functions.

A point data origin 76 is defined at or proximate to the root 64 at the leading edge 58. In one embodiment as presented in Table I and Table II below, the point data origin 76 is defined at or proximate to (above or below) a transition or intersection line 78 defined between the fillet 72 and the airfoil 52. The point data origin 76 corresponds to the non-dimensional Z value of Table I and/or Table II (presented below) at Z equals 0.

The Cartesian coordinate values for the X, Y and Z coordinates are set forth in non-dimensionalized units provided in Table I and/or Table II, although other units of dimensions may be used when the values are appropriately converted. The X, Y and Z values set forth in Table I and/or Table II are expressed in non-dimensional form (X, Y, and Z) from 0% to 100% of the height or span of the airfoil 52. As one example only, the Cartesian coordinate values of X, Y and Z may be convertible to dimensional distances by multiplying the X, Y and Z values by a height of the airfoil at the leading edge 58 and multiplying by a constant number (e.g., 100). As one example only, the Cartesian coordinate values of X, Y and Z may be convertible to dimensional distances by multiplying the X, Y and Z values by a height of the airfoil at the trailing edge 60 and multiplying by a constant number (e.g., 100).

To convert the Z value to a Z coordinate value, e.g., in inches, the non-dimensional Z value given in Table I and/or Table II is multiplied by the Z height of the airfoil in inches. As described above, the Cartesian coordinate system has orthogonally-related X, Y and Z axes, and the X axis lies generally parallel to a centerline of the rotor shaft 14, i.e., the rotary axis, and a positive X coordinate value is axial toward an aft, i.e., exhaust end of the turbine 10. The positive Y coordinate value extends tangentially in the direction of rotation of the rotor, and the positive Z coordinate value is radially outwardly from the base 66 toward the radial tip 68.

All the values in Table I and/or Table II are given at room temperature and do not include the fillet 72 or coatings (not shown).

By defining X and Y coordinate values at selected locations in a Z direction normal to the X, Y plane, the profile section or airfoil shape of the airfoil 52 of the turbine rotor blade 50 at each Z distance along the length of the airfoil 52 can be ascertained. By connecting the X and Y values with smooth continuing arcs, each profile section at each distance Z is fixed. The airfoil profiles of the various surface locations between the distances Z are determined by smoothly connecting the adjacent profile sections to one another to form the airfoil profile.

The Table I values are generated and shown to four decimal places for determining the profile of the airfoil 52. Similarly, the Table II values are generated and shown to four decimal places for determining the trailing edge profile 61 of airfoil 52. As the turbine rotor blade 50 heats up during operation of the gas turbine 12, surface stress and temperature will cause a change in the X, Y and Z values. Accordingly, the values for the profile given in Table I and/or Table II define the "nominal" airfoil profile, that is, the profile of an uncoated airfoil at ambient, non-operating or non-hot conditions (e.g., room temperature).

There are typical manufacturing tolerances as well as coatings which must be accounted for in the actual profile of the airfoil 52. Each cross-section is joined smoothly with the other cross-sections to form the complete airfoil shape. It will therefore be appreciated that +/− typical manufacturing tolerances, i.e., +/− values, including any coating thicknesses, are additive to the X and Y values given in Table I and/or Table II below. Accordingly, a distance of +/−5% in a direction normal to any surface location along the airfoil profile defines an airfoil profile envelope for this particular turbine rotor blade 50 airfoil design and turbine 12, i.e., a range of variation between measured points on the actual airfoil surface at nominal cold or room temperature and the ideal position of those points as given in Table I and Table II below at the same temperature. The data provided in Table I and/or Table II is scalable (i.e., by uniform geometric scaling), and the geometry pertains to all aerodynamic scales, at, above and/or below 3000 RPM. The design of the airfoil 52 for turbine rotor blade 50 is robust to this range of variation without impairment of mechanical and aerodynamic functions.

TABLE I

| SUCTION-SIDE | | | PRESSURE-SIDE | | |
|---|---|---|---|---|---|
| X (%) | Y (%) | Z (%) | X (%) | Y (%) | Z (%) |
| 0.0000 | 0.0000 | 0.0000 | 0.0000 | 0.0000 | 0.0000 |
| −0.5684 | 0.9404 | 0.0000 | 0.5544 | −0.5025 | 0.0000 |
| −0.8295 | 2.0127 | 0.0000 | 1.2112 | −0.8618 | 0.0000 |
| −0.8590 | 3.1186 | 0.0000 | 1.9270 | −1.0807 | 0.0000 |
| −0.7326 | 4.2176 | 0.0000 | 2.6695 | −1.1902 | 0.0000 |
| −0.4926 | 5.2983 | 0.0000 | 3.4190 | −1.2126 | 0.0000 |
| −0.1670 | 6.3552 | 0.0000 | 4.1671 | −1.1663 | 0.0000 |
| 0.2246 | 7.3896 | 0.0000 | 4.9109 | −1.0667 | 0.0000 |
| 0.6695 | 8.4029 | 0.0000 | 5.6450 | −0.9179 | 0.0000 |
| 1.1607 | 9.3938 | 0.0000 | 6.3720 | −0.7326 | 0.0000 |
| 1.6913 | 10.3651 | 0.0000 | 7.0920 | −0.5249 | 0.0000 |
| 2.2569 | 11.3167 | 0.0000 | 7.8106 | −0.3074 | 0.0000 |
| 2.8506 | 12.2500 | 0.0000 | 8.5278 | −0.0912 | 0.0000 |
| 3.4709 | 13.1651 | 0.0000 | 9.2478 | 0.1193 | 0.0000 |
| 4.1165 | 14.0648 | 0.0000 | 9.9707 | 0.3200 | 0.0000 |
| 4.7832 | 14.9476 | 0.0000 | 10.6963 | 0.5137 | 0.0000 |
| 5.4710 | 15.8136 | 0.0000 | 11.4219 | 0.7004 | 0.0000 |
| 6.1783 | 16.6641 | 0.0000 | 12.1503 | 0.8800 | 0.0000 |

TABLE I-continued

| SUCTION-SIDE | | | PRESSURE-SIDE | | |
|---|---|---|---|---|---|
| X (%) | Y (%) | Z (%) | X (%) | Y (%) | Z (%) |
| 6.9054 | 17.4992 | 0.0000 | 12.8802 | 1.0526 | 0.0000 |
| 7.6520 | 18.3146 | 0.0000 | 13.6114 | 1.2183 | 0.0000 |
| 8.4184 | 19.1133 | 0.0000 | 14.3455 | 1.3769 | 0.0000 |
| 9.2057 | 19.8908 | 0.0000 | 15.0795 | 1.5256 | 0.0000 |
| 10.0142 | 20.6459 | 0.0000 | 15.8164 | 1.6674 | 0.0000 |
| 10.8437 | 21.3771 | 0.0000 | 16.5546 | 1.7993 | 0.0000 |
| 11.6970 | 22.0817 | 0.0000 | 17.2943 | 1.9228 | 0.0000 |
| 12.5742 | 22.7568 | 0.0000 | 18.0353 | 2.0351 | 0.0000 |
| 13.4739 | 23.4010 | 0.0000 | 18.7792 | 2.1376 | 0.0000 |
| 14.3974 | 24.0088 | 0.0000 | 19.5231 | 2.2302 | 0.0000 |
| 15.3462 | 24.5800 | 0.0000 | 20.2684 | 2.3116 | 0.0000 |
| 16.3174 | 25.1091 | 0.0000 | 21.0150 | 2.3804 | 0.0000 |
| 17.3111 | 25.5947 | 0.0000 | 21.7631 | 2.4393 | 0.0000 |
| 18.3287 | 26.0312 | 0.0000 | 22.5126 | 2.4856 | 0.0000 |
| 19.3659 | 26.4144 | 0.0000 | 23.2621 | 2.5193 | 0.0000 |
| 20.4227 | 26.7414 | 0.0000 | 24.0116 | 2.5404 | 0.0000 |
| 21.4964 | 27.0081 | 0.0000 | 24.7610 | 2.5488 | 0.0000 |
| 22.5842 | 27.2116 | 0.0000 | 25.5119 | 2.5446 | 0.0000 |
| 23.6817 | 27.3478 | 0.0000 | 26.2614 | 2.5249 | 0.0000 |
| 24.7849 | 27.4165 | 0.0000 | 27.0109 | 2.4927 | 0.0000 |
| 25.8923 | 27.4165 | 0.0000 | 27.7590 | 2.4449 | 0.0000 |
| 26.9955 | 27.3449 | 0.0000 | 28.5057 | 2.3818 | 0.0000 |
| 28.0930 | 27.2060 | 0.0000 | 29.2523 | 2.3046 | 0.0000 |
| 29.1794 | 26.9969 | 0.0000 | 29.9962 | 2.2106 | 0.0000 |
| 30.2517 | 26.7246 | 0.0000 | 30.7387 | 2.1011 | 0.0000 |
| 31.3057 | 26.3877 | 0.0000 | 31.4769 | 1.9748 | 0.0000 |
| 32.3387 | 25.9933 | 0.0000 | 32.2138 | 1.8330 | 0.0000 |
| 33.3492 | 25.5428 | 0.0000 | 32.9464 | 1.6730 | 0.0000 |
| 34.3359 | 25.0404 | 0.0000 | 33.6763 | 1.4976 | 0.0000 |
| 35.2959 | 24.4902 | 0.0000 | 34.4005 | 1.3053 | 0.0000 |
| 36.2293 | 23.8965 | 0.0000 | 35.1205 | 1.0948 | 0.0000 |
| 37.1360 | 23.2621 | 0.0000 | 35.8363 | 0.8674 | 0.0000 |
| 38.0146 | 22.5912 | 0.0000 | 36.5451 | 0.6246 | 0.0000 |
| 38.8679 | 21.8866 | 0.0000 | 37.2482 | 0.3635 | 0.0000 |
| 39.6946 | 21.1512 | 0.0000 | 37.9458 | 0.0856 | 0.0000 |
| 40.4946 | 20.3877 | 0.0000 | 38.6349 | −0.2091 | 0.0000 |
| 41.2708 | 19.5989 | 0.0000 | 39.3184 | −0.5193 | 0.0000 |
| 42.0216 | 18.7862 | 0.0000 | 39.9921 | −0.8463 | 0.0000 |
| 42.7487 | 17.9511 | 0.0000 | 40.6588 | −1.1902 | 0.0000 |
| 43.4518 | 17.0978 | 0.0000 | 41.3171 | −1.5495 | 0.0000 |
| 44.1340 | 16.2262 | 0.0000 | 41.9669 | −1.9256 | 0.0000 |
| 44.7950 | 15.3392 | 0.0000 | 42.6069 | −2.3158 | 0.0000 |
| 45.4350 | 14.4367 | 0.0000 | 43.2371 | −2.7214 | 0.0000 |
| 46.0554 | 13.5216 | 0.0000 | 43.8589 | −3.1425 | 0.0000 |
| 46.6575 | 12.5939 | 0.0000 | 44.4694 | −3.5762 | 0.0000 |
| 47.2428 | 11.6549 | 0.0000 | 45.0715 | −4.0253 | 0.0000 |
| 47.8126 | 10.7047 | 0.0000 | 45.6624 | −4.4871 | 0.0000 |
| 48.3656 | 9.7475 | 0.0000 | 46.2421 | −4.9615 | 0.0000 |
| 48.9045 | 8.7805 | 0.0000 | 46.8133 | −5.4499 | 0.0000 |
| 49.4295 | 7.8064 | 0.0000 | 47.3719 | −5.9496 | 0.0000 |
| 49.9418 | 6.8254 | 0.0000 | 47.9207 | −6.4604 | 0.0000 |
| 50.4414 | 5.8387 | 0.0000 | 48.4596 | −6.9826 | 0.0000 |
| 50.9298 | 4.8464 | 0.0000 | 48.9874 | −7.5159 | 0.0000 |
| 51.4084 | 3.8485 | 0.0000 | 49.5053 | −8.0577 | 0.0000 |
| 51.8772 | 2.8464 | 0.0000 | 50.0119 | −8.6106 | 0.0000 |
| 52.3376 | 1.8400 | 0.0000 | 50.5088 | −9.1721 | 0.0000 |
| 52.7881 | 0.8295 | 0.0000 | 50.9972 | −9.7419 | 0.0000 |
| 53.2302 | −0.1839 | 0.0000 | 51.4744 | −10.3201 | 0.0000 |
| 53.6667 | −1.2014 | 0.0000 | 51.9418 | −10.9068 | 0.0000 |
| 54.0934 | −2.2218 | 0.0000 | 52.4007 | −11.5005 | 0.0000 |
| 54.5144 | −3.2450 | 0.0000 | 52.8499 | −12.0998 | 0.0000 |
| 54.9285 | −4.2709 | 0.0000 | 53.2920 | −12.7075 | 0.0000 |
| 55.3369 | −5.2997 | 0.0000 | 53.7243 | −13.3195 | 0.0000 |
| 55.7383 | −6.3299 | 0.0000 | 54.1481 | −13.9384 | 0.0000 |
| 56.1341 | −7.3629 | 0.0000 | 54.5650 | −14.5616 | 0.0000 |
| 56.5257 | −8.3987 | 0.0000 | 54.9734 | −15.1918 | 0.0000 |
| 56.9131 | −9.4345 | 0.0000 | 55.3748 | −15.8248 | 0.0000 |
| 57.2962 | −10.4717 | 0.0000 | 55.7664 | −16.4648 | 0.0000 |
| 57.6780 | −11.5103 | 0.0000 | 56.1496 | −17.1104 | 0.0000 |
| 58.0584 | −12.5504 | 0.0000 | 56.5229 | −17.7602 | 0.0000 |
| 58.4387 | −13.5890 | 0.0000 | 56.8850 | −18.4157 | 0.0000 |
| 58.8205 | −14.6276 | 0.0000 | 57.2387 | −19.0782 | 0.0000 |
| 59.2036 | −15.6648 | 0.0000 | 57.5812 | −19.7448 | 0.0000 |
| 59.5868 | −16.7034 | 0.0000 | 57.9152 | −20.4157 | 0.0000 |
| 59.9672 | −17.7420 | 0.0000 | 58.2422 | −21.0908 | 0.0000 |
| 60.3419 | −18.7834 | 0.0000 | 58.5650 | −21.7687 | 0.0000 |
| 60.7110 | −19.8262 | 0.0000 | 58.8836 | −22.4466 | 0.0000 |
| 61.0731 | −20.8719 | 0.0000 | 59.2022 | −23.1259 | 0.0000 |
| 61.4296 | −21.9189 | 0.0000 | 59.5180 | −23.8066 | 0.0000 |
| 61.7791 | −22.9687 | 0.0000 | 59.8324 | −24.4888 | 0.0000 |
| 62.1244 | −24.0200 | 0.0000 | 60.1426 | −25.1709 | 0.0000 |
| 62.4640 | −25.0726 | 0.0000 | 60.4542 | −25.8530 | 0.0000 |
| 62.5623 | −25.3870 | 0.0000 | 60.6030 | −26.1730 | 0.0000 |
| 62.6704 | −25.7421 | 0.0000 | 60.7742 | −26.5309 | 0.0000 |
| 62.7728 | −26.1000 | 0.0000 | 60.9496 | −26.8860 | 0.0000 |
| 62.8668 | −26.4579 | 0.0000 | 61.1335 | −27.2369 | 0.0000 |
| 62.9511 | −26.8200 | 0.0000 | 61.3328 | −27.5807 | 0.0000 |
| 63.0016 | −27.1878 | 0.0000 | 61.5756 | −27.8937 | 0.0000 |
| 62.9805 | −27.5569 | 0.0000 | 61.8886 | −28.1379 | 0.0000 |
| 62.8668 | −27.9092 | 0.0000 | 62.2591 | −28.2783 | 0.0000 |
| 62.6409 | −28.1997 | 0.0000 | 62.6409 | −28.1997 | 0.0000 |
| 0.3425 | 1.3446 | 10.0001 | 0.3425 | 1.3446 | 10.0001 |
| −0.2723 | 2.2776 | 10.0001 | 0.9235 | 0.8618 | 10.0001 |
| −0.5811 | 3.3558 | 10.0001 | 1.6000 | 0.5249 | 10.0001 |
| −0.6569 | 4.4787 | 10.0001 | 2.3313 | 0.3256 | 10.0001 |
| −0.5698 | 5.6015 | 10.0001 | 3.0850 | 0.2428 | 10.0001 |
| −0.3663 | 6.7089 | 10.0001 | 3.8443 | 0.2484 | 10.0001 |
| −0.0758 | 7.7966 | 10.0001 | 4.5994 | 0.3228 | 10.0001 |
| 0.2849 | 8.8619 | 10.0001 | 5.3460 | 0.4533 | 10.0001 |
| 0.7018 | 9.9075 | 10.0001 | 6.0829 | 0.6316 | 10.0001 |
| 1.1677 | 10.9335 | 10.0001 | 6.8099 | 0.8463 | 10.0001 |
| 1.6730 | 11.9384 | 10.0001 | 7.5285 | 1.0905 | 10.0001 |
| 2.2134 | 12.9251 | 10.0001 | 8.2415 | 1.3516 | 10.0001 |
| 2.7874 | 13.8949 | 10.0001 | 8.9517 | 1.6155 | 10.0001 |
| 3.3881 | 14.8465 | 10.0001 | 9.6647 | 1.8765 | 10.0001 |
| 4.0155 | 15.7813 | 10.0001 | 10.3805 | 2.1277 | 10.0001 |
| 4.6667 | 16.6992 | 10.0001 | 11.0991 | 2.3678 | 10.0001 |
| 5.3390 | 17.6017 | 10.0001 | 11.8219 | 2.5979 | 10.0001 |
| 6.0338 | 18.4887 | 10.0001 | 12.5475 | 2.8169 | 10.0001 |
| 6.7482 | 19.3575 | 10.0001 | 13.2760 | 3.0274 | 10.0001 |
| 7.4850 | 20.2094 | 10.0001 | 14.0072 | 3.2281 | 10.0001 |
| 8.2429 | 21.0403 | 10.0001 | 14.7413 | 3.4190 | 10.0001 |
| 9.0247 | 21.8515 | 10.0001 | 15.4781 | 3.6001 | 10.0001 |
| 9.8289 | 22.6375 | 10.0001 | 16.2178 | 3.7685 | 10.0001 |
| 10.6584 | 23.3982 | 10.0001 | 16.9602 | 3.9257 | 10.0001 |
| 11.5131 | 24.1309 | 10.0001 | 17.7041 | 4.0702 | 10.0001 |
| 12.3946 | 24.8326 | 10.0001 | 18.4508 | 4.2022 | 10.0001 |
| 13.3012 | 25.4993 | 10.0001 | 19.2003 | 4.3201 | 10.0001 |
| 14.2346 | 26.1281 | 10.0001 | 19.9512 | 4.4239 | 10.0001 |
| 15.1960 | 26.7148 | 10.0001 | 20.7049 | 4.5152 | 10.0001 |
| 16.1827 | 27.2551 | 10.0001 | 21.4585 | 4.5909 | 10.0001 |
| 17.1960 | 27.7450 | 10.0001 | 22.2150 | 4.6527 | 10.0001 |
| 18.2346 | 28.1814 | 10.0001 | 22.9716 | 4.6976 | 10.0001 |
| 19.2943 | 28.5576 | 10.0001 | 23.7295 | 4.7271 | 10.0001 |
| 20.3764 | 28.8706 | 10.0001 | 24.4874 | 4.7411 | 10.0001 |
| 21.4740 | 29.1148 | 10.0001 | 25.2467 | 4.7369 | 10.0001 |
| 22.5870 | 29.2874 | 10.0001 | 26.0046 | 4.7145 | 10.0001 |
| 23.7084 | 29.3871 | 10.0001 | 26.7611 | 4.6752 | 10.0001 |
| 24.8326 | 29.4109 | 10.0001 | 27.5176 | 4.6176 | 10.0001 |
| 25.9569 | 29.3576 | 10.0001 | 28.2727 | 4.5418 | 10.0001 |
| 27.0755 | 29.2285 | 10.0001 | 29.0250 | 4.4464 | 10.0001 |
| 28.1829 | 29.0250 | 10.0001 | 29.7745 | 4.3327 | 10.0001 |
| 29.2734 | 28.7513 | 10.0001 | 30.5211 | 4.1994 | 10.0001 |
| 30.3471 | 28.4088 | 10.0001 | 31.2636 | 4.0464 | 10.0001 |
| 31.3969 | 28.0046 | 10.0001 | 32.0033 | 3.8737 | 10.0001 |
| 32.4215 | 27.5400 | 10.0001 | 32.7359 | 3.6829 | 10.0001 |
| 33.4208 | 27.0221 | 10.0001 | 33.4643 | 3.4709 | 10.0001 |
| 34.3935 | 26.4537 | 10.0001 | 34.1871 | 3.2407 | 10.0001 |
| 35.3366 | 25.8404 | 10.0001 | 34.9029 | 2.9909 | 10.0001 |
| 36.2531 | 25.1863 | 10.0001 | 35.6117 | 2.7214 | 10.0001 |
| 37.1402 | 24.4930 | 10.0001 | 36.3135 | 2.4337 | 10.0001 |
| 38.0005 | 23.7674 | 10.0001 | 37.0082 | 2.1277 | 10.0001 |
| 38.8328 | 23.0094 | 10.0001 | 37.6932 | 1.8035 | 10.0001 |
| 39.6399 | 22.2249 | 10.0001 | 38.3697 | 1.4611 | 10.0001 |
| 40.4202 | 21.4136 | 10.0001 | 39.0377 | 1.1018 | 10.0001 |
| 41.1767 | 20.5799 | 10.0001 | 39.6974 | 0.7270 | 10.0001 |
| 41.9080 | 19.7252 | 10.0001 | 40.3458 | 0.3340 | 10.0001 |
| 42.6167 | 18.8494 | 10.0001 | 40.9858 | −0.0730 | 10.0001 |
| 43.3031 | 17.9581 | 10.0001 | 41.6146 | −0.4954 | 10.0001 |
| 43.9683 | 17.0501 | 10.0001 | 42.2350 | −0.9333 | 10.0001 |
| 44.6126 | 16.1265 | 10.0001 | 42.8441 | −1.3853 | 10.0001 |
| 45.2385 | 15.1918 | 10.0001 | 43.4434 | −1.8499 | 10.0001 |

TABLE I-continued

| SUCTION-SIDE | | | PRESSURE-SIDE | | | SUCTION-SIDE | | | PRESSURE-SIDE | | |
|---|---|---|---|---|---|---|---|---|---|---|---|
| X (%) | Y (%) | Z (%) | X (%) | Y (%) | Z (%) | X (%) | Y (%) | Z (%) | X (%) | Y (%) | Z (%) |
| 45.8449 | 14.2430 | 10.0001 | 44.0315 | −2.3271 | 10.0001 | 15.4486 | 28.1913 | 20.0003 | 21.0263 | 6.0492 | 20.0003 |
| 46.4343 | 13.2844 | 10.0001 | 44.6112 | −2.8183 | 10.0001 | 16.4508 | 28.7232 | 20.0003 | 21.7856 | 6.1180 | 20.0003 |
| 47.0084 | 12.3146 | 10.0001 | 45.1796 | −3.3193 | 10.0001 | 17.4795 | 29.2004 | 20.0003 | 22.5463 | 6.1685 | 20.0003 |
| 47.5656 | 11.3377 | 10.0001 | 45.7368 | −3.8330 | 10.0001 | 18.5322 | 29.6215 | 20.0003 | 23.3084 | 6.1994 | 20.0003 |
| 48.1073 | 10.3510 | 10.0001 | 46.2856 | −4.3580 | 10.0001 | 19.6087 | 29.9780 | 20.0003 | 24.0705 | 6.2134 | 20.0003 |
| 48.6365 | 9.3573 | 10.0001 | 46.8231 | −4.8927 | 10.0001 | 20.7049 | 30.2657 | 20.0003 | 24.8326 | 6.2078 | 20.0003 |
| 49.1516 | 8.3566 | 10.0001 | 47.3508 | −5.4373 | 10.0001 | 21.8193 | 30.4818 | 20.0003 | 25.5947 | 6.1825 | 20.0003 |
| 49.6554 | 7.3503 | 10.0001 | 47.8687 | −5.9903 | 10.0001 | 22.9435 | 30.6222 | 20.0003 | 26.3555 | 6.1376 | 20.0003 |
| 50.1481 | 6.3369 | 10.0001 | 48.3768 | −6.5531 | 10.0001 | 24.0761 | 30.6839 | 20.0003 | 27.1148 | 6.0717 | 20.0003 |
| 50.6281 | 5.3194 | 10.0001 | 48.8765 | −7.1243 | 10.0001 | 25.2102 | 30.6657 | 20.0003 | 27.8727 | 5.9860 | 20.0003 |
| 51.0997 | 4.2962 | 10.0001 | 49.3649 | −7.7040 | 10.0001 | 26.3400 | 30.5674 | 20.0003 | 28.6278 | 5.8780 | 20.0003 |
| 51.5600 | 3.2702 | 10.0001 | 49.8463 | −8.2906 | 10.0001 | 27.4600 | 30.3906 | 20.0003 | 29.3787 | 5.7503 | 20.0003 |
| 52.0134 | 2.2386 | 10.0001 | 50.3179 | −8.8843 | 10.0001 | 28.5646 | 30.1380 | 20.0003 | 30.1267 | 5.6015 | 20.0003 |
| 52.4569 | 1.2042 | 10.0001 | 50.7811 | −9.4850 | 10.0001 | 29.6523 | 29.8138 | 20.0003 | 30.8692 | 5.4303 | 20.0003 |
| 52.8920 | 0.1670 | 10.0001 | 51.52344 | −10.0928 | 10.0001 | 30.7162 | 29.4222 | 20.0003 | 31.6075 | 5.2380 | 20.0003 |
| 53.3200 | −0.8744 | 10.0001 | 51.6807 | −10.7061 | 10.0001 | 31.7548 | 28.9660 | 20.0003 | 32.3401 | 5.0260 | 20.0003 |
| 53.7411 | −1.9186 | 10.0001 | 52.1200 | −11.3251 | 10.0001 | 32.7654 | 28.4537 | 20.0003 | 33.0657 | 4.7916 | 20.0003 |
| 54.1551 | −2.9657 | 10.0001 | 52.5495 | −11.9496 | 10.0001 | 33.7478 | 27.8867 | 20.0003 | 33.7843 | 4.5376 | 20.0003 |
| 54.5622 | −4.0155 | 10.0001 | 52.9720 | −12.5798 | 10.0001 | 34.7022 | 27.2734 | 20.0003 | 34.4945 | 4.2625 | 20.0003 |
| 54.9636 | −5.0667 | 10.0001 | 53.3860 | −13.2142 | 10.0001 | 35.6258 | 26.6151 | 20.0003 | 35.1977 | 3.9678 | 20.0003 |
| 55.3580 | −6.1208 | 10.0001 | 53.7930 | −13.8542 | 10.0001 | 36.5198 | 25.9176 | 20.0003 | 35.8924 | 3.6534 | 20.0003 |
| 55.7482 | −7.1762 | 10.0001 | 54.1944 | −14.4984 | 10.0001 | 37.3858 | 25.1849 | 20.0003 | 36.5788 | 3.3207 | 20.0003 |
| 56.1327 | −8.2345 | 10.0001 | 54.5888 | −15.1455 | 10.0001 | 38.2237 | 24.4200 | 20.0003 | 37.2539 | 2.9685 | 20.0003 |
| 56.5117 | −9.2942 | 10.0001 | 54.9762 | −15.7981 | 10.0001 | 39.0335 | 23.6270 | 20.0003 | 37.9219 | 2.5993 | 20.0003 |
| 56.8892 | −10.3552 | 10.0001 | 55.3580 | −16.4536 | 10.0001 | 39.8167 | 22.8073 | 20.0003 | 38.5788 | 2.2120 | 20.0003 |
| 57.2640 | −11.4163 | 10.0001 | 55.7299 | −17.1146 | 10.0001 | 40.5760 | 21.9638 | 20.0003 | 39.2244 | 1.8091 | 20.0003 |
| 57.6359 | −12.4788 | 10.0001 | 56.0934 | −17.7799 | 10.0001 | 41.3086 | 21.0978 | 20.0003 | 39.8616 | 1.3895 | 20.0003 |
| 58.0092 | −13.5412 | 10.0001 | 56.4457 | −18.4508 | 10.0001 | 42.0174 | 20.2136 | 20.0003 | 40.4876 | 0.9544 | 20.0003 |
| 58.3826 | −14.6023 | 10.0001 | 56.7882 | −19.1247 | 10.0001 | 42.7038 | 19.3097 | 20.0003 | 41.1037 | 0.5053 | 20.0003 |
| 58.7559 | −15.6648 | 10.0001 | 57.1208 | −19.8094 | 10.0001 | 43.3690 | 18.3918 | 20.0003 | 41.7087 | 0.0407 | 20.0003 |
| 59.1307 | −16.7258 | 10.0001 | 57.4436 | −20.4957 | 10.0001 | 44.0118 | 17.4571 | 20.0003 | 42.3023 | −0.4365 | 20.0003 |
| 59.5026 | −17.7883 | 10.0001 | 57.7608 | −21.1849 | 10.0001 | 44.6364 | 16.5097 | 20.0003 | 42.8876 | −0.9249 | 20.0003 |
| 59.8717 | −18.8522 | 10.0001 | 58.0752 | −21.8754 | 10.0001 | 45.2413 | 15.5511 | 20.0003 | 43.4617 | −1.4274 | 20.0003 |
| 60.2352 | −19.9175 | 10.0001 | 58.3868 | −22.5659 | 10.0001 | 45.8280 | 14.5813 | 20.0003 | 44.0245 | −1.9411 | 20.0003 |
| 60.5903 | −20.9856 | 10.0001 | 58.6984 | −23.2579 | 10.0001 | 46.3992 | 13.6002 | 20.0003 | 44.5789 | −2.4646 | 20.0003 |
| 60.9384 | −22.0564 | 10.0001 | 59.0071 | −23.9498 | 10.0001 | 46.9536 | 12.6107 | 20.0003 | 45.1220 | −2.9993 | 20.0003 |
| 61.2795 | −23.1287 | 10.0001 | 59.3145 | −24.6446 | 10.0001 | 47.4926 | 11.6142 | 20.0003 | 45.6554 | −3.5439 | 20.0003 |
| 61.6149 | −24.2038 | 10.0001 | 59.6191 | −25.3379 | 10.0001 | 48.0175 | 10.6079 | 20.0003 | 46.1803 | −4.0969 | 20.0003 |
| 61.9433 | −25.2804 | 10.0001 | 59.9236 | −26.0326 | 10.0001 | 48.5298 | 9.5959 | 20.0003 | 46.6954 | −4.6597 | 20.0003 |
| 62.0374 | −25.5961 | 10.0001 | 60.0682 | −26.3541 | 10.0001 | 49.0295 | 8.5784 | 20.0003 | 47.2007 | −5.2310 | 20.0003 |
| 62.1412 | −25.9526 | 10.0001 | 60.2338 | −26.7148 | 10.0001 | 49.5165 | 7.5538 | 20.0003 | 47.6961 | −5.8092 | 20.0003 |
| 62.2381 | −26.3105 | 10.0001 | 60.4051 | −27.0713 | 10.0001 | 49.9937 | 6.5250 | 20.0003 | 48.1845 | −6.3945 | 20.0003 |
| 62.3265 | −26.6698 | 10.0001 | 60.5833 | −27.4249 | 10.0001 | 50.4597 | 5.4906 | 20.0003 | 48.6631 | −6.9882 | 20.0003 |
| 62.4065 | −27.0320 | 10.0001 | 60.7784 | −27.7702 | 10.0001 | 50.9158 | 4.4534 | 20.0003 | 49.1333 | −7.5875 | 20.0003 |
| 62.4514 | −27.3997 | 10.0001 | 61.0156 | −28.0860 | 10.0001 | 51.3635 | 3.4106 | 20.0003 | 49.5951 | −8.1938 | 20.0003 |
| 62.4261 | −27.7688 | 10.0001 | 61.3258 | −28.3344 | 10.0001 | 51.8014 | 2.3649 | 20.0003 | 50.0498 | −8.8071 | 20.0003 |
| 62.3068 | −28.1197 | 10.0001 | 61.6935 | −28.4790 | 10.0001 | 52.2323 | 1.3151 | 20.0003 | 50.4961 | −9.4247 | 20.0003 |
| 62.0767 | −28.4046 | 10.0001 | 62.0767 | −28.4046 | 10.0001 | 52.6548 | 0.2625 | 20.0003 | 50.9355 | −10.0479 | 20.0003 |
| 0.6147 | 2.6442 | 20.0003 | 0.6147 | 2.6442 | 20.0003 | 53.0702 | −0.7930 | 20.0003 | 51.3663 | −10.6766 | 20.0003 |
| −0.0168 | 3.5762 | 20.0003 | 1.2042 | 2.1656 | 20.0003 | 53.4772 | −1.8513 | 20.0003 | 51.7902 | −11.3096 | 20.0003 |
| −0.3453 | 4.6583 | 20.0003 | 1.8863 | 1.8302 | 20.0003 | 53.8787 | −2.9109 | 20.0003 | 52.2070 | −11.9482 | 20.0003 |
| −0.4393 | 5.7882 | 20.0003 | 2.6218 | 1.6351 | 20.0003 | 54.2744 | −3.9748 | 20.0003 | 52.6183 | −12.5911 | 20.0003 |
| −0.3677 | 6.9208 | 20.0003 | 3.3811 | 1.5537 | 20.0003 | 54.6632 | −5.0401 | 20.0003 | 53.0211 | −13.2381 | 20.0003 |
| −0.1768 | 8.0380 | 20.0003 | 4.1432 | 1.5635 | 20.0003 | 55.0464 | −6.1082 | 20.0003 | 53.4183 | −13.8893 | 20.0003 |
| 0.1039 | 9.1370 | 20.0003 | 4.9011 | 1.6421 | 20.0003 | 55.4239 | −7.1776 | 20.0003 | 53.8085 | −14.5434 | 20.0003 |
| 0.4547 | 10.2149 | 20.0003 | 5.6520 | 1.7769 | 20.0003 | 55.7959 | −8.2485 | 20.0003 | 54.1916 | −15.2016 | 20.0003 |
| 0.8646 | 11.2731 | 20.0003 | 6.3931 | 1.9579 | 20.0003 | 56.1650 | −9.3208 | 20.0003 | 54.5692 | −15.8641 | 20.0003 |
| 1.3235 | 12.3103 | 20.0003 | 7.1215 | 2.1797 | 20.0003 | 56.5299 | −10.3945 | 20.0003 | 54.9411 | −16.5308 | 20.0003 |
| 1.8232 | 13.3279 | 20.0003 | 7.8401 | 2.4351 | 20.0003 | 56.8920 | −11.4696 | 20.0003 | 55.3032 | −17.2016 | 20.0003 |
| 2.3607 | 14.3272 | 20.0003 | 8.5517 | 2.7116 | 20.0003 | 57.2541 | −12.5433 | 20.0003 | 55.6583 | −17.8753 | 20.0003 |
| 2.9320 | 15.3069 | 20.0003 | 9.2591 | 2.9951 | 20.0003 | 57.6162 | −13.6184 | 20.0003 | 56.0036 | −18.5560 | 20.0003 |
| 3.5327 | 16.2697 | 20.0003 | 9.9679 | 3.2772 | 20.0003 | 57.9784 | −14.6935 | 20.0003 | 56.3390 | −19.2410 | 20.0003 |
| 4.1601 | 17.2143 | 20.0003 | 10.6794 | 3.5481 | 20.0003 | 58.3405 | −15.7686 | 20.0003 | 56.6618 | −19.9301 | 20.0003 |
| 4.8113 | 18.1420 | 20.0003 | 11.3967 | 3.8078 | 20.0003 | 58.7026 | −16.8437 | 20.0003 | 56.9776 | −20.6249 | 20.0003 |
| 5.4878 | 19.0529 | 20.0003 | 12.1167 | 4.0562 | 20.0003 | 59.0647 | −17.9174 | 20.0003 | 57.2864 | −21.3224 | 20.0003 |
| 6.1853 | 19.9469 | 20.0003 | 12.8423 | 4.2934 | 20.0003 | 59.4226 | −18.9940 | 20.0003 | 57.5924 | −22.0200 | 20.0003 |
| 6.9054 | 20.8227 | 20.0003 | 13.5693 | 4.5194 | 20.0003 | 59.7749 | −20.0719 | 20.0003 | 57.8970 | −22.7189 | 20.0003 |
| 7.6478 | 21.6803 | 20.0003 | 14.3020 | 4.7341 | 20.0003 | 60.1187 | −21.1526 | 20.0003 | 58.2001 | −23.4179 | 20.0003 |
| 8.4127 | 22.5182 | 20.0003 | 15.0360 | 4.9362 | 20.0003 | 60.4556 | −22.2361 | 20.0003 | 58.5019 | −24.1182 | 20.0003 |
| 9.2001 | 23.3337 | 20.0003 | 15.7743 | 5.1257 | 20.0003 | 60.7840 | −23.3210 | 20.0003 | 58.8022 | −24.8186 | 20.0003 |
| 10.0142 | 24.1238 | 20.0003 | 16.5167 | 5.3025 | 20.0003 | 61.1082 | −24.4088 | 20.0003 | 59.0998 | −25.5218 | 20.0003 |
| 10.8521 | 24.8874 | 20.0003 | 17.2620 | 5.4653 | 20.0003 | 61.4268 | −25.4965 | 20.0003 | 59.3987 | −26.2221 | 20.0003 |
| 11.7181 | 25.6214 | 20.0003 | 18.0087 | 5.6127 | 20.0003 | 61.5167 | −25.8123 | 20.0003 | 59.5377 | −26.5435 | 20.0003 |
| 12.6093 | 26.3218 | 20.0003 | 18.7596 | 5.7460 | 20.0003 | 61.6149 | −26.1674 | 20.0003 | 59.6977 | −26.9042 | 20.0003 |
| 13.5286 | 26.9856 | 20.0003 | 19.5133 | 5.8625 | 20.0003 | 61.7061 | −26.5239 | 20.0003 | 59.8633 | −27.2607 | 20.0003 |
| 14.4746 | 27.6102 | 20.0003 | 20.2684 | 5.9650 | 20.0003 | 61.7903 | −26.8832 | 20.0003 | 60.0373 | −27.6144 | 20.0003 |

TABLE I-continued

| SUCTION-SIDE | | | PRESSURE-SIDE | | | SUCTION-SIDE | | | PRESSURE-SIDE | | |
|---|---|---|---|---|---|---|---|---|---|---|---|
| X (%) | Y (%) | Z (%) | X (%) | Y (%) | Z (%) | X (%) | Y (%) | Z (%) | X (%) | Y (%) | Z (%) |
| 61.8647 | −27.2439 | 20.0003 | 60.2268 | −27.9597 | 20.0003 | 50.8021 | 4.3341 | 30.0004 | 48.8737 | −7.6366 | 30.0004 |
| 61.9040 | −27.6102 | 20.0003 | 60.4612 | −28.2755 | 20.0003 | 51.2316 | 3.2857 | 30.0004 | 49.3228 | −8.2527 | 30.0004 |
| 61.8717 | −27.9765 | 20.0003 | 60.7658 | −28.5253 | 20.0003 | 51.6513 | 2.2344 | 30.0004 | 49.7635 | −8.8745 | 30.0004 |
| 61.7468 | −28.3232 | 20.0003 | 61.1321 | −28.6713 | 20.0003 | 52.0639 | 1.1790 | 30.0004 | 50.1972 | −9.5005 | 30.0004 |
| 61.5124 | −28.6025 | 20.0003 | 61.5124 | −28.6025 | 20.0003 | 52.4695 | 0.1207 | 30.0004 | 50.6253 | −10.1335 | 30.0004 |
| 0.8253 | 3.9327 | 30.0004 | 0.8253 | 3.9327 | 30.0004 | 52.8681 | −0.9404 | 30.0004 | 51.0449 | −10.7693 | 30.0004 |
| 0.2007 | 4.8702 | 30.0004 | 1.4063 | 3.4443 | 30.0004 | 53.2597 | −2.0028 | 30.0004 | 51.4576 | −11.4107 | 30.0004 |
| −0.1221 | 5.9524 | 30.0004 | 2.0814 | 3.0962 | 30.0004 | 53.6443 | −3.0681 | 30.0004 | 51.8632 | −12.0549 | 30.0004 |
| −0.2119 | 7.0808 | 30.0004 | 2.8127 | 2.8828 | 30.0004 | 54.0232 | −4.1362 | 30.0004 | 52.2632 | −12.7047 | 30.0004 |
| −0.1361 | 8.2120 | 30.0004 | 3.5692 | 2.7846 | 30.0004 | 54.3966 | −5.2057 | 30.0004 | 52.6562 | −13.3574 | 30.0004 |
| 0.0604 | 9.3279 | 30.0004 | 4.3313 | 2.7762 | 30.0004 | 54.7643 | −6.2766 | 30.0004 | 53.0421 | −14.0142 | 30.0004 |
| 0.3495 | 10.4226 | 30.0004 | 5.0906 | 2.8379 | 30.0004 | 55.1278 | −7.3503 | 30.0004 | 53.4239 | −14.6753 | 30.0004 |
| 0.7102 | 11.4963 | 30.0004 | 5.8443 | 2.9558 | 30.0004 | 55.4857 | −8.4254 | 30.0004 | 53.7972 | −15.3392 | 30.0004 |
| 1.1298 | 12.5489 | 30.0004 | 6.5896 | 3.1200 | 30.0004 | 55.8394 | −9.5005 | 30.0004 | 54.1664 | −16.0072 | 30.0004 |
| 1.5986 | 13.5805 | 30.0004 | 7.3236 | 3.3264 | 30.0004 | 56.1903 | −10.5784 | 30.0004 | 54.5271 | −16.6781 | 30.0004 |
| 2.1109 | 14.5911 | 30.0004 | 8.0464 | 3.5678 | 30.0004 | 56.5383 | −11.6563 | 30.0004 | 54.8822 | −17.3532 | 30.0004 |
| 2.6611 | 15.5806 | 30.0004 | 8.8760 | 3.8344 | 30.0004 | 56.8864 | −12.7342 | 30.0004 | 55.2274 | −18.0325 | 30.0004 |
| 3.2436 | 16.5518 | 30.0004 | 9.4696 | 4.1137 | 30.0004 | 57.2345 | −13.8121 | 30.0004 | 55.5643 | −18.7175 | 30.0004 |
| 3.8583 | 17.5048 | 30.0004 | 10.1798 | 4.3930 | 30.0004 | 57.5840 | −14.8900 | 30.0004 | 55.8913 | −19.4066 | 30.0004 |
| 4.4997 | 18.4382 | 30.0004 | 10.8914 | 4.6639 | 30.0004 | 57.9334 | −15.9679 | 30.0004 | 56.2071 | −20.0999 | 30.0004 |
| 5.1664 | 19.3533 | 30.0004 | 11.6086 | 4.9250 | 30.0004 | 58.2829 | −17.0444 | 30.0004 | 56.5131 | −20.7975 | 30.0004 |
| 5.8583 | 20.2501 | 30.0004 | 12.3300 | 5.1720 | 30.0004 | 58.6324 | −18.1224 | 30.0004 | 56.8148 | −21.4978 | 30.0004 |
| 6.5727 | 21.1301 | 30.0004 | 13.0556 | 5.4064 | 30.0004 | 58.9777 | −19.2017 | 30.0004 | 57.1124 | −22.1996 | 30.0004 |
| 7.3096 | 21.9905 | 30.0004 | 13.7841 | 5.6281 | 30.0004 | 59.3173 | −20.2824 | 30.0004 | 57.4085 | −22.9028 | 30.0004 |
| 8.0689 | 22.8312 | 30.0004 | 14.5181 | 5.8373 | 30.0004 | 59.6486 | −21.3659 | 30.0004 | 57.7047 | −23.6045 | 30.0004 |
| 8.8507 | 23.6523 | 30.0004 | 15.2550 | 6.0338 | 30.0004 | 59.9728 | −22.4508 | 30.0004 | 57.9994 | −24.3077 | 30.0004 |
| 9.6549 | 24.4481 | 30.0004 | 15.9946 | 6.2148 | 30.0004 | 60.2900 | −23.5386 | 30.0004 | 58.2913 | −25.0123 | 30.0004 |
| 10.4858 | 25.2200 | 30.0004 | 16.7385 | 6.3818 | 30.0004 | 60.6030 | −24.6277 | 30.0004 | 58.5819 | −25.7169 | 30.0004 |
| 11.3405 | 25.9625 | 30.0004 | 17.4852 | 6.5334 | 30.0004 | 60.9103 | −25.7183 | 30.0004 | 58.8724 | −26.4214 | 30.0004 |
| 12.2205 | 26.6755 | 30.0004 | 18.2360 | 6.6682 | 30.0004 | 60.9959 | −26.0312 | 30.0004 | 59.0071 | −26.7428 | 30.0004 |
| 13.1286 | 27.3534 | 30.0004 | 18.9897 | 6.7875 | 30.0004 | 61.0886 | −26.3849 | 30.0004 | 59.1629 | −27.1007 | 30.0004 |
| 14.0620 | 27.9948 | 30.0004 | 19.7448 | 6.8899 | 30.0004 | 61.1756 | −26.7400 | 30.0004 | 59.3243 | −27.4572 | 30.0004 |
| 15.0234 | 28.5941 | 30.0004 | 20.5027 | 6.9741 | 30.0004 | 61.2542 | −27.0979 | 30.0004 | 59.4942 | −27.8081 | 30.0004 |
| 16.0115 | 29.1471 | 30.0004 | 21.2621 | 7.0415 | 30.0004 | 61.3244 | −27.4573 | 30.0004 | 59.6808 | −28.1534 | 30.0004 |
| 17.0262 | 29.6509 | 30.0004 | 22.0228 | 7.0892 | 30.0004 | 61.3581 | −27.8207 | 30.0004 | 59.9096 | −28.4678 | 30.0004 |
| 18.0676 | 30.0987 | 30.0004 | 22.7849 | 7.1173 | 30.0004 | 61.3202 | −28.1829 | 30.0004 | 60.2114 | −28.7162 | 30.0004 |
| 19.1315 | 30.4860 | 30.0004 | 23.5470 | 7.1271 | 30.0004 | 61.1896 | −28.5253 | 30.0004 | 60.5735 | −28.8636 | 30.0004 |
| 20.2178 | 30.8089 | 30.0004 | 24.3091 | 7.1159 | 30.0004 | 60.9524 | −28.7990 | 30.0004 | 60.9524 | −28.7990 | 30.0004 |
| 21.3224 | 31.0601 | 30.0004 | 25.0712 | 7.0836 | 30.0004 | 1.0148 | 5.2913 | 40.0006 | 1.0148 | 5.2913 | 40.0006 |
| 22.4410 | 31.2369 | 30.0004 | 25.8319 | 7.0317 | 30.0004 | 0.4098 | 6.2331 | 40.0006 | 1.5818 | 4.7888 | 40.0006 |
| 23.5681 | 31.3366 | 30.0004 | 26.5898 | 6.9573 | 30.0004 | 0.0968 | 7.3110 | 40.0006 | 2.2428 | 4.4197 | 40.0006 |
| 24.7007 | 31.3576 | 30.0004 | 27.3463 | 6.8633 | 30.0004 | 0.0168 | 8.4338 | 40.0006 | 2.9643 | 4.1811 | 40.0006 |
| 25.8319 | 31.2959 | 30.0004 | 28.1000 | 6.7454 | 30.0004 | 0.1025 | 9.5566 | 40.0006 | 3.7137 | 4.0534 | 40.0006 |
| 26.9562 | 31.1541 | 30.0004 | 28.8495 | 6.6078 | 30.0004 | 0.3102 | 10.6626 | 40.0006 | 4.4744 | 4.0155 | 40.0006 |
| 28.0678 | 30.9352 | 30.0004 | 29.5948 | 6.4478 | 30.0004 | 0.6105 | 11.7475 | 40.0006 | 5.2338 | 4.0492 | 40.0006 |
| 29.1611 | 30.6404 | 30.0004 | 30.3359 | 6.2654 | 30.0004 | 0.9853 | 12.8101 | 40.0006 | 5.9889 | 4.1390 | 40.0006 |
| 30.2334 | 30.2741 | 30.0004 | 31.0699 | 6.0618 | 30.0004 | 1.4190 | 13.8486 | 40.0006 | 6.7369 | 4.2780 | 40.0006 |
| 31.2790 | 29.8418 | 30.0004 | 31.7983 | 5.8373 | 30.0004 | 1.9032 | 14.8648 | 40.0006 | 7.4766 | 4.4590 | 40.0006 |
| 32.2994 | 29.3492 | 30.0004 | 32.5198 | 5.5903 | 30.0004 | 2.4309 | 15.8585 | 40.0006 | 8.2050 | 4.6752 | 40.0006 |
| 33.2903 | 28.7990 | 30.0004 | 33.2342 | 5.3236 | 30.0004 | 2.9965 | 16.8325 | 40.0006 | 8.9250 | 4.9208 | 40.0006 |
| 34.2503 | 28.1983 | 30.0004 | 33.9401 | 5.0373 | 30.0004 | 3.5958 | 17.7855 | 40.0006 | 9.6380 | 5.1860 | 40.0006 |
| 35.1808 | 27.5527 | 30.0004 | 34.6377 | 4.7299 | 30.0004 | 4.2260 | 18.7175 | 40.0006 | 10.3482 | 5.4569 | 40.0006 |
| 36.0805 | 26.8635 | 30.0004 | 35.3268 | 4.4029 | 30.0004 | 4.8843 | 19.6312 | 40.0006 | 11.0612 | 5.7236 | 40.0006 |
| 36.9507 | 26.1379 | 30.0004 | 36.0061 | 4.0576 | 30.0004 | 5.5692 | 20.5252 | 40.0006 | 11.7784 | 5.9762 | 40.0006 |
| 37.7914 | 25.3786 | 30.0004 | 36.6770 | 3.6941 | 30.0004 | 6.2780 | 21.3996 | 40.0006 | 12.4998 | 6.2134 | 40.0006 |
| 38.6026 | 24.5884 | 30.0004 | 37.3367 | 3.3123 | 30.0004 | 7.0092 | 22.2558 | 40.0006 | 13.2269 | 6.4380 | 40.0006 |
| 39.3872 | 23.7716 | 30.0004 | 37.9879 | 2.9151 | 30.0004 | 7.7629 | 23.0923 | 40.0006 | 13.9581 | 6.6471 | 40.0006 |
| 40.1451 | 22.9294 | 30.0004 | 38.6265 | 2.4997 | 30.0004 | 8.5377 | 23.9077 | 40.0006 | 14.6935 | 6.8436 | 40.0006 |
| 40.8764 | 22.0649 | 30.0004 | 39.2567 | 2.0702 | 30.0004 | 9.3363 | 24.7021 | 40.0006 | 15.4318 | 7.0247 | 40.0006 |
| 41.5837 | 21.1792 | 30.0004 | 39.8756 | 1.6253 | 30.0004 | 10.1587 | 25.4712 | 40.0006 | 16.1743 | 7.1889 | 40.0006 |
| 42.2659 | 20.2754 | 30.0004 | 40.4834 | 1.1649 | 30.0004 | 11.0051 | 26.2123 | 40.0006 | 16.9195 | 7.3376 | 40.0006 |
| 42.9269 | 19.3547 | 30.0004 | 41.0813 | 0.6919 | 30.0004 | 11.8767 | 26.9253 | 40.0006 | 17.6690 | 7.4682 | 40.0006 |
| 43.5655 | 18.4185 | 30.0004 | 41.6694 | 0.2063 | 30.0004 | 12.7735 | 27.6046 | 40.0006 | 18.4213 | 7.5819 | 40.0006 |
| 44.1831 | 17.4697 | 30.0004 | 42.2462 | −0.2919 | 30.0004 | 13.6970 | 28.2488 | 40.0006 | 19.1750 | 7.6787 | 40.0006 |
| 44.7824 | 16.5083 | 30.0004 | 42.8132 | −0.8014 | 30.0004 | 14.6472 | 28.8537 | 40.0006 | 19.9315 | 7.7559 | 40.0006 |
| 45.3634 | 15.5357 | 30.0004 | 43.3704 | −1.3221 | 30.0004 | 15.6241 | 29.4137 | 40.0006 | 20.6908 | 7.8148 | 40.0006 |
| 45.9263 | 14.5518 | 30.0004 | 43.9164 | −1.8541 | 30.0004 | 16.6262 | 29.9246 | 40.0006 | 21.4501 | 7.8527 | 40.0006 |
| 46.4722 | 13.5609 | 30.0004 | 44.4526 | −2.3958 | 30.0004 | 17.6536 | 30.3836 | 40.0006 | 22.2094 | 7.8724 | 40.0006 |
| 47.0042 | 12.5602 | 30.0004 | 44.9803 | −2.9460 | 30.0004 | 18.7062 | 30.7836 | 40.0006 | 22.9701 | 7.8710 | 40.0006 |
| 47.5207 | 11.5510 | 30.0004 | 45.4982 | −3.5060 | 30.0004 | 19.7799 | 31.1218 | 40.0006 | 23.7309 | 7.8471 | 40.0006 |
| 48.0245 | 10.5363 | 30.0004 | 46.0063 | −4.0744 | 30.0004 | 20.8733 | 31.3913 | 40.0006 | 24.4902 | 7.8036 | 40.0006 |
| 48.5144 | 9.5159 | 30.0004 | 46.5059 | −4.6499 | 30.0004 | 21.9807 | 31.5878 | 40.0006 | 25.2481 | 7.7391 | 40.0006 |
| 48.9930 | 8.4885 | 30.0004 | 46.9957 | −5.2338 | 30.0004 | 23.1007 | 31.7085 | 40.0006 | 26.0032 | 7.6520 | 40.0006 |
| 49.4603 | 7.4569 | 30.0004 | 47.4772 | −5.8246 | 30.0004 | 24.2249 | 31.7506 | 40.0006 | 26.7555 | 7.5440 | 40.0006 |
| 49.9179 | 6.4197 | 30.0004 | 47.9516 | −6.4225 | 30.0004 | 25.3491 | 31.7127 | 40.0006 | 27.5049 | 7.4134 | 40.0006 |
| 50.3642 | 5.3797 | 30.0004 | 48.4161 | −7.0261 | 30.0004 | 26.4691 | 31.5948 | 40.0006 | 28.2502 | 7.2605 | 40.0006 |

TABLE I-continued

| SUCTION-SIDE | | | PRESSURE-SIDE | | |
|---|---|---|---|---|---|
| X (%) | Y (%) | Z (%) | X (%) | Y (%) | Z (%) |
| 27.5779 | 31.3969 | 40.0006 | 28.9913 | 7.0864 | 40.0006 |
| 28.6699 | 31.1246 | 40.0006 | 29.7253 | 6.8913 | 40.0006 |
| 29.7408 | 30.7794 | 40.0006 | 30.4538 | 6.6738 | 40.0006 |
| 30.7878 | 30.3667 | 40.0006 | 31.1766 | 6.4366 | 40.0006 |
| 31.8082 | 29.8909 | 40.0006 | 31.8924 | 6.1769 | 40.0006 |
| 32.7991 | 29.3590 | 40.0006 | 32.5998 | 5.8976 | 40.0006 |
| 33.7605 | 28.7723 | 40.0006 | 33.2987 | 5.5987 | 40.0006 |
| 34.6910 | 28.1393 | 40.0006 | 33.9892 | 5.2801 | 40.0006 |
| 35.5921 | 27.4628 | 40.0006 | 34.6714 | 4.9432 | 40.0006 |
| 36.4609 | 26.7484 | 40.0006 | 35.3437 | 4.5881 | 40.0006 |
| 37.3002 | 25.9976 | 40.0006 | 36.0061 | 4.2162 | 40.0006 |
| 38.1100 | 25.2158 | 40.0006 | 36.6602 | 3.8260 | 40.0006 |
| 38.8918 | 24.4060 | 40.0006 | 37.3030 | 3.4204 | 40.0006 |
| 39.6469 | 23.5709 | 40.0006 | 37.9360 | 2.9993 | 40.0006 |
| 40.3753 | 22.7119 | 40.0006 | 38.3591 | 2.5642 | 40.0006 |
| 41.0785 | 21.8333 | 40.0006 | 39.1725 | 2.1137 | 40.0006 |
| 41.7564 | 20.9350 | 40.0006 | 39.7746 | 1.6491 | 40.0006 |
| 42.4118 | 20.0185 | 40.0006 | 40.3669 | 1.1719 | 40.0006 |
| 43.0434 | 19.0880 | 40.0006 | 40.9493 | 0.6821 | 40.0006 |
| 43.6553 | 18.1434 | 40.0006 | 41.5206 | 0.1811 | 40.0006 |
| 44.2476 | 17.1848 | 40.0006 | 42.0834 | −0.3312 | 40.0006 |
| 44.8217 | 16.2164 | 40.0006 | 42.6350 | −0.8533 | 40.0006 |
| 45.3775 | 15.2381 | 40.0006 | 43.1767 | −1.3867 | 40.0006 |
| 45.9164 | 14.2500 | 40.0006 | 43.7101 | −1.9299 | 40.0006 |
| 46.4414 | 13.2535 | 40.0006 | 44.2336 | −2.4811 | 40.0006 |
| 46.9494 | 12.2500 | 40.0006 | 44.7473 | −3.0428 | 40.0006 |
| 47.4463 | 11.2381 | 40.0006 | 45.2526 | −3.6113 | 40.0006 |
| 47.9277 | 10.2219 | 40.0006 | 45.7480 | −4.1867 | 40.0006 |
| 48.3993 | 9.1987 | 40.0006 | 46.2364 | −4.7720 | 40.0006 |
| 48.8582 | 8.1713 | 40.0006 | 46.7150 | −5.3629 | 40.0006 |
| 49.3074 | 7.1383 | 40.0006 | 47.1852 | −5.9594 | 40.0006 |
| 49.7453 | 6.1011 | 40.0006 | 47.6470 | −6.5643 | 40.0006 |
| 50.1747 | 5.0611 | 40.0006 | 48.1017 | −7.1734 | 40.0006 |
| 50.5958 | 4.0169 | 40.0006 | 48.5480 | −7.7896 | 40.0006 |
| 51.0070 | 2.9699 | 40.0006 | 48.9874 | −8.4099 | 40.0006 |
| 51.4127 | 1.9186 | 40.0006 | 49.4182 | −9.0373 | 40.0006 |
| 51.8098 | 0.8646 | 40.0006 | 49.8421 | −9.6675 | 40.0006 |
| 52.2000 | −0.1909 | 40.0006 | 50.2604 | −10.3033 | 40.0006 |
| 52.5832 | −1.2491 | 40.0006 | 50.6702 | −10.9447 | 40.0006 |
| 52.9607 | −2.3102 | 40.0006 | 51.0744 | −11.5889 | 40.0006 |
| 53.3327 | −3.3727 | 40.0006 | 51.4702 | −12.2374 | 40.0006 |
| 53.6976 | −4.4366 | 40.0006 | 51.8618 | −12.8900 | 40.0006 |
| 54.0583 | −5.5032 | 40.0006 | 52.2463 | −13.5455 | 40.0006 |
| 54.4134 | −6.5713 | 40.0006 | 52.6239 | −14.2051 | 40.0006 |
| 54.7643 | −7.6422 | 40.0006 | 52.9972 | −14.8690 | 40.0006 |
| 55.1095 | −8.7131 | 40.0006 | 53.3636 | −15.5357 | 40.0006 |
| 55.4520 | −9.7854 | 40.0006 | 53.7243 | −16.2051 | 40.0006 |
| 55.7917 | −10.8591 | 40.0006 | 54.0780 | −16.8774 | 40.0006 |
| 56.1299 | −11.9328 | 40.0006 | 54.4260 | −17.5539 | 40.0006 |
| 56.4668 | −13.0065 | 40.0006 | 54.7643 | −18.2344 | 40.0006 |
| 56.8036 | −14.0802 | 40.0006 | 55.0941 | −18.9210 | 40.0006 |
| 57.1433 | −15.1539 | 40.0006 | 55.4127 | −19.6101 | 40.0006 |
| 57.4829 | −16.2276 | 40.0006 | 55.7229 | −20.3048 | 40.0006 |
| 57.8226 | −17.3013 | 40.0006 | 56.0232 | −21.0038 | 40.0006 |
| 58.1622 | −18.3736 | 40.0006 | 56.3180 | −21.7056 | 40.0006 |
| 58.4991 | −19.4487 | 40.0006 | 56.6113 | −22.4073 | 40.0006 |
| 58.8289 | −20.5238 | 40.0006 | 56.9019 | −23.1091 | 40.0006 |
| 59.1531 | −21.6031 | 40.0006 | 57.1924 | −23.8123 | 40.0006 |
| 59.4675 | −22.6838 | 40.0006 | 57.4815 | −24.5154 | 40.0006 |
| 59.7763 | −23.7659 | 40.0006 | 57.7692 | −25.2200 | 40.0006 |
| 60.0822 | −24.8495 | 40.0006 | 58.0541 | −25.9246 | 40.0006 |
| 60.3812 | −25.9344 | 40.0006 | 58.3419 | −26.6291 | 40.0006 |
| 60.4654 | −26.2474 | 40.0006 | 58.4738 | −26.9492 | 40.0006 |
| 60.5552 | −26.6011 | 40.0006 | 58.6268 | −27.3085 | 40.0006 |
| 60.6409 | −26.9562 | 40.0006 | 58.7868 | −27.6635 | 40.0006 |
| 60.7180 | −27.3127 | 40.0006 | 58.9538 | −28.0158 | 40.0006 |
| 60.7840 | −27.6706 | 40.0006 | 59.1377 | −28.3597 | 40.0006 |
| 60.8163 | −28.0341 | 40.0006 | 59.3664 | −28.6755 | 40.0006 |
| 60.7756 | −28.3962 | 40.0006 | 59.6668 | −28.9239 | 40.0006 |
| 60.6437 | −28.7358 | 40.0006 | 60.0275 | −29.0699 | 40.0006 |
| 60.4051 | −29.0067 | 40.0006 | 60.4051 | −29.0067 | 40.0006 |
| 1.2253 | 6.7959 | 49.9993 | 1.2253 | 6.7959 | 49.9993 |
| 0.6344 | 7.7362 | 49.9993 | 1.7797 | 6.2808 | 49.9993 |
| 0.3242 | 8.8057 | 49.9993 | 2.4295 | 5.8920 | 49.9993 |
| 0.2428 | 9.9187 | 49.9993 | 3.1397 | 5.6281 | 49.9993 |
| 0.3284 | 11.0331 | 49.9993 | 3.8822 | 5.4710 | 49.9993 |
| 0.5376 | 12.1293 | 49.9993 | 4.6387 | 5.4036 | 49.9993 |
| 0.8407 | 13.2044 | 49.9993 | 5.3980 | 5.4092 | 49.9993 |
| 1.2197 | 14.2542 | 49.9993 | 6.1545 | 5.4724 | 49.9993 |
| 1.6604 | 15.2802 | 49.9993 | 6.9054 | 5.5860 | 49.9993 |
| 2.1530 | 16.2823 | 49.9993 | 7.6478 | 5.7432 | 49.9993 |
| 2.6892 | 17.2620 | 49.9993 | 8.3819 | 5.9411 | 49.9993 |
| 3.2646 | 18.2192 | 49.9993 | 9.1047 | 6.1713 | 49.9993 |
| 3.8751 | 19.1540 | 49.9993 | 9.8205 | 6.4254 | 49.9993 |
| 4.5152 | 20.0691 | 49.9993 | 10.5307 | 6.6920 | 49.9993 |
| 5.1832 | 20.9645 | 49.9993 | 11.2423 | 6.9559 | 49.9993 |
| 5.8766 | 21.8389 | 49.9993 | 11.9595 | 7.2071 | 49.9993 |
| 6.5924 | 22.6965 | 49.9993 | 12.6809 | 7.4415 | 49.9993 |
| 7.3320 | 23.5330 | 49.9993 | 13.4093 | 7.6577 | 49.9993 |
| 8.0927 | 24.3498 | 49.9993 | 14.1420 | 7.8570 | 49.9993 |
| 8.8773 | 25.1456 | 49.9993 | 14.8788 | 8.0394 | 49.9993 |
| 9.6843 | 25.9162 | 49.9993 | 15.6185 | 8.2050 | 49.9993 |
| 10.5166 | 26.6614 | 49.9993 | 16.3637 | 8.3538 | 49.9993 |
| 11.3728 | 27.3772 | 49.9993 | 17.1118 | 8.4829 | 49.9993 |
| 12.2570 | 28.0607 | 49.9993 | 17.8627 | 8.5924 | 49.9993 |
| 13.1679 | 28.7064 | 49.9993 | 18.6164 | 8.6808 | 49.9993 |
| 14.1055 | 29.3113 | 49.9993 | 19.3729 | 8.7496 | 49.9993 |
| 15.0711 | 29.8727 | 49.9993 | 20.1308 | 8.7973 | 49.9993 |
| 16.0648 | 30.3836 | 49.9993 | 20.8887 | 8.8240 | 49.9993 |
| 17.0823 | 30.8411 | 49.9993 | 21.6480 | 8.8282 | 49.9993 |
| 18.1252 | 31.2397 | 49.9993 | 22.4073 | 8.8114 | 49.9993 |
| 19.1904 | 31.5752 | 49.9993 | 23.1652 | 8.7721 | 49.9993 |
| 20.2754 | 31.8419 | 49.9993 | 23.9217 | 8.7103 | 49.9993 |
| 21.3743 | 32.0355 | 49.9993 | 24.6768 | 8.6261 | 49.9993 |
| 22.4845 | 32.1520 | 49.9993 | 25.4277 | 8.5180 | 49.9993 |
| 23.6003 | 32.1899 | 49.9993 | 26.1758 | 8.3889 | 49.9993 |
| 24.7161 | 32.1478 | 49.9993 | 26.9197 | 8.2373 | 49.9993 |
| 25.8263 | 32.0257 | 49.9993 | 27.6579 | 8.0619 | 49.9993 |
| 26.9253 | 31.8250 | 49.9993 | 28.3920 | 7.8668 | 49.9993 |
| 28.0060 | 31.5485 | 49.9993 | 29.1190 | 7.6478 | 49.9993 |
| 29.0671 | 31.2018 | 49.9993 | 29.8390 | 7.4092 | 49.9993 |
| 30.1043 | 30.7864 | 49.9993 | 30.5520 | 7.1482 | 49.9993 |
| 31.1134 | 30.3092 | 49.9993 | 31.2580 | 6.8689 | 49.9993 |
| 32.0945 | 29.7759 | 49.9993 | 31.9555 | 6.5685 | 49.9993 |
| 33.0447 | 29.1906 | 49.9993 | 32.6447 | 6.2485 | 49.9993 |
| 33.9654 | 28.5590 | 49.9993 | 33.3240 | 5.9117 | 49.9993 |
| 34.8552 | 27.8839 | 49.9993 | 33.9949 | 5.5566 | 49.9993 |
| 35.7156 | 27.1709 | 49.9993 | 34.6559 | 5.1832 | 49.9993 |
| 36.5451 | 26.4242 | 49.9993 | 35.3072 | 4.7945 | 49.9993 |
| 37.3465 | 25.6467 | 49.9993 | 35.9500 | 4.3888 | 49.9993 |
| 38.1198 | 24.8411 | 49.9993 | 36.5816 | 3.9678 | 49.9993 |
| 38.8665 | 24.0102 | 49.9993 | 37.2047 | 3.5341 | 49.9993 |
| 39.5865 | 23.1568 | 49.9993 | 37.8167 | 3.0850 | 49.9993 |
| 40.2827 | 22.2838 | 49.9993 | 38.4188 | 2.6232 | 49.9993 |
| 40.9536 | 21.3912 | 49.9993 | 39.0111 | 2.1488 | 49.9993 |
| 41.6034 | 20.4831 | 49.9993 | 39.5949 | 1.6618 | 49.9993 |
| 42.2294 | 19.5582 | 49.9993 | 40.1676 | 1.1635 | 49.9993 |
| 42.8357 | 18.6206 | 49.9993 | 40.7304 | 0.6554 | 49.9993 |
| 43.4238 | 17.6704 | 49.9993 | 41.2848 | 0.1361 | 49.9993 |
| 43.9922 | 16.7104 | 49.9993 | 41.8294 | −0.3930 | 49.9993 |
| 44.5438 | 15.7392 | 49.9993 | 42.3641 | −0.9319 | 49.9993 |
| 45.0785 | 14.7595 | 49.9993 | 42.8890 | −1.4793 | 49.9993 |
| 45.5992 | 13.7714 | 49.9993 | 43.4069 | −2.0351 | 49.9993 |
| 46.1059 | 12.7763 | 49.9993 | 43.9150 | −2.5993 | 49.9993 |
| 46.5985 | 11.7742 | 49.9993 | 44.4147 | −3.1706 | 49.9993 |
| 47.0800 | 10.7665 | 49.9993 | 44.9045 | −3.7502 | 49.9993 |
| 47.5487 | 9.7517 | 49.9993 | 45.3873 | −4.3369 | 49.9993 |
| 48.0063 | 8.7342 | 49.9993 | 45.8617 | −4.9292 | 49.9993 |
| 48.4526 | 7.7096 | 49.9993 | 46.3291 | −5.5285 | 49.9993 |
| 48.8905 | 6.6822 | 49.9993 | 46.7866 | −6.1334 | 49.9993 |
| 49.3172 | 5.6520 | 49.9993 | 47.2386 | −6.7440 | 49.9993 |
| 49.7368 | 4.6162 | 49.9993 | 47.6821 | −7.3601 | 49.9993 |
| 50.1481 | 3.5776 | 49.9993 | 48.1186 | −7.9805 | 49.9993 |
| 50.5523 | 2.5376 | 49.9993 | 48.5466 | −8.6064 | 49.9993 |
| 50.9481 | 1.4934 | 49.9993 | 48.9691 | −9.2380 | 49.9993 |
| 51.3383 | 0.4463 | 49.9993 | 49.3846 | −9.8724 | 49.9993 |
| 51.7214 | −0.6021 | 49.9993 | 49.7944 | −10.5124 | 49.9993 |
| 52.0990 | −1.6534 | 49.9993 | 50.1958 | −11.1566 | 49.9993 |
| 52.4695 | −2.7060 | 49.9993 | 50.5930 | −11.8037 | 49.9993 |
| 52.8358 | −3.7615 | 49.9993 | 50.9832 | −12.4549 | 49.9993 |
| 53.1951 | −4.8183 | 49.9993 | 51.3663 | −13.1104 | 49.9993 |
| 53.5516 | −5.8766 | 49.9993 | 51.7453 | −13.7686 | 49.9993 |

TABLE I-continued

| SUCTION-SIDE | | | PRESSURE-SIDE | | | SUCTION-SIDE | | | PRESSURE-SIDE | | |
|---|---|---|---|---|---|---|---|---|---|---|---|
| X (%) | Y (%) | Z (%) | X (%) | Y (%) | Z (%) | X (%) | Y (%) | Z (%) | X (%) | Y (%) | Z (%) |
| 53.9011 | −6.9376 | 49.9993 | 52.1172 | −14.4297 | 49.9993 | 37.1977 | 25.1723 | 59.9994 | 35.8419 | 4.5783 | 59.9994 |
| 54.2478 | −7.9987 | 49.9993 | 52.4849 | −15.0949 | 49.9993 | 37.9290 | 24.3428 | 59.9994 | 36.4496 | 4.1250 | 59.9994 |
| 54.5902 | −9.0626 | 49.9993 | 52.8457 | −15.7616 | 49.9993 | 38.6363 | 23.4909 | 59.9994 | 37.0475 | 3.6576 | 59.9994 |
| 54.9285 | −10.1265 | 49.9993 | 53.2022 | −16.4325 | 49.9993 | 39.3199 | 22.6207 | 59.9994 | 37.6356 | 3.1790 | 59.9994 |
| 55.2653 | −11.1903 | 49.9993 | 53.5516 | −17.1062 | 49.9993 | 39.9809 | 21.7336 | 59.9994 | 38.2139 | 2.6878 | 59.9994 |
| 55.5994 | −12.2556 | 49.9993 | 53.8955 | −17.7827 | 49.9993 | 40.6195 | 20.8298 | 59.9994 | 38.7837 | 2.1867 | 59.9994 |
| 55.9348 | −13.3223 | 49.9993 | 54.2323 | −18.4634 | 49.9993 | 41.2371 | 19.9119 | 59.9994 | 39.3437 | 1.6758 | 59.9994 |
| 56.2689 | −14.3876 | 49.9993 | 54.5580 | −19.1483 | 49.9993 | 41.8364 | 18.9813 | 59.9994 | 39.8939 | 1.1537 | 59.9994 |
| 56.6057 | −15.4514 | 49.9993 | 54.8752 | −19.8389 | 49.9993 | 42.4160 | 18.0381 | 59.9994 | 40.4357 | 0.6232 | 59.9994 |
| 56.9426 | −16.5167 | 49.9993 | 55.1825 | −20.5336 | 49.9993 | 42.9803 | 17.0866 | 59.9994 | 40.9690 | 0.0828 | 59.9994 |
| 57.2808 | −17.5806 | 49.9993 | 55.4815 | −21.2312 | 49.9993 | 43.5276 | 16.1237 | 59.9994 | 41.4925 | −0.4660 | 59.9994 |
| 57.6191 | −18.6445 | 49.9993 | 55.7748 | −21.9315 | 49.9993 | 44.0596 | 15.1539 | 59.9994 | 42.0076 | −1.0218 | 59.9994 |
| 57.9531 | −19.7098 | 49.9993 | 56.0653 | −22.6319 | 49.9993 | 44.5775 | 14.1756 | 59.9994 | 42.5157 | −1.5860 | 59.9994 |
| 58.2829 | −20.7764 | 49.9993 | 56.3573 | −23.3337 | 49.9993 | 45.0813 | 13.1904 | 59.9994 | 43.0139 | −2.1572 | 59.9994 |
| 58.6057 | −21.8459 | 49.9993 | 56.6464 | −24.0354 | 49.9993 | 45.5740 | 12.1995 | 59.9994 | 43.5052 | −2.7355 | 59.9994 |
| 58.9215 | −22.9168 | 49.9993 | 56.9355 | −24.7372 | 49.9993 | 46.0540 | 11.2030 | 59.9994 | 43.9880 | −3.3207 | 59.9994 |
| 59.2303 | −23.9905 | 49.9993 | 57.2233 | −25.4390 | 49.9993 | 46.5228 | 10.2008 | 59.9994 | 44.4638 | −3.9116 | 59.9994 |
| 59.5349 | −25.0656 | 49.9993 | 57.5096 | −26.1421 | 49.9993 | 46.9817 | 9.1931 | 59.9994 | 44.9312 | −4.5081 | 59.9994 |
| 59.8338 | −26.1407 | 49.9993 | 57.7973 | −26.8453 | 49.9993 | 47.4294 | 8.1812 | 59.9994 | 45.3915 | −5.1102 | 59.9994 |
| 59.9180 | −26.4565 | 49.9993 | 57.9306 | −27.1681 | 49.9993 | 47.8687 | 7.1650 | 59.9994 | 45.8463 | −5.7194 | 59.9994 |
| 60.0107 | −26.8116 | 49.9993 | 58.0864 | −27.5288 | 49.9993 | 48.2996 | 6.1461 | 59.9994 | 46.2926 | −6.3313 | 59.9994 |
| 60.0977 | −27.1695 | 49.9993 | 58.2478 | −27.8867 | 49.9993 | 48.7207 | 5.1229 | 59.9994 | 46.7319 | −6.9503 | 59.9994 |
| 60.1763 | −27.5274 | 49.9993 | 58.4163 | −28.2418 | 49.9993 | 49.1361 | 4.0969 | 59.9994 | 47.1642 | −7.5734 | 59.9994 |
| 60.2465 | −27.8881 | 49.9993 | 58.6029 | −28.5885 | 49.9993 | 49.5432 | 3.0681 | 59.9994 | 47.5908 | −8.1994 | 59.9994 |
| 60.2801 | −28.2544 | 49.9993 | 58.8317 | −28.9071 | 49.9993 | 49.9432 | 2.0365 | 59.9994 | 48.0119 | −8.8310 | 59.9994 |
| 60.2437 | −28.6193 | 49.9993 | 59.1349 | −29.1583 | 49.9993 | 50.3361 | 1.0021 | 59.9994 | 48.4245 | −9.4668 | 59.9994 |
| 60.1145 | −28.9632 | 49.9993 | 59.4984 | −29.3071 | 49.9993 | 50.7235 | −0.0351 | 59.9994 | 48.8330 | −10.1068 | 59.9994 |
| 59.8787 | −29.2397 | 49.9993 | 59.8787 | −29.2397 | 49.9993 | 51.1053 | −1.0737 | 59.9994 | 49.2344 | −10.7496 | 59.9994 |
| 1.4428 | 8.4549 | 59.9994 | 1.4428 | 8.4549 | 59.9994 | 51.4814 | −2.1151 | 59.9994 | 49.6316 | −11.3967 | 59.9994 |
| 0.8646 | 9.3910 | 59.9994 | 1.9860 | 7.9285 | 59.9994 | 51.8520 | −3.1579 | 59.9994 | 50.0218 | −12.0465 | 59.9994 |
| 0.5544 | 10.4507 | 59.9994 | 2.6246 | 7.5215 | 59.9994 | 52.2169 | −4.2022 | 59.9994 | 50.4063 | −12.7005 | 59.9994 |
| 0.4688 | 11.5538 | 59.9994 | 3.3250 | 7.2324 | 59.9994 | 52.5776 | −5.2478 | 59.9994 | 50.7867 | −13.3574 | 59.9994 |
| 0.5488 | 12.6570 | 59.9994 | 4.0604 | 7.0485 | 59.9994 | 52.9327 | −6.2962 | 59.9994 | 51.1614 | −14.0170 | 59.9994 |
| 0.7537 | 13.7448 | 59.9994 | 4.8127 | 6.9517 | 59.9994 | 53.2850 | −7.3461 | 59.9994 | 51.5305 | −14.6795 | 59.9994 |
| 1.0555 | 14.8086 | 59.9994 | 5.5706 | 6.9278 | 59.9994 | 53.6316 | −8.3959 | 59.9994 | 51.8955 | −15.3448 | 59.9994 |
| 1.4344 | 15.8486 | 59.9994 | 6.3285 | 6.9657 | 59.9994 | 53.9755 | −9.4486 | 59.9994 | 52.2548 | −16.0115 | 59.9994 |
| 1.8779 | 16.8634 | 59.9994 | 7.0822 | 7.0555 | 59.9994 | 54.3166 | −10.5012 | 59.9994 | 52.6099 | −16.6823 | 59.9994 |
| 2.3748 | 17.8515 | 59.9994 | 7.8275 | 7.1917 | 59.9994 | 54.6548 | −11.5552 | 59.9994 | 52.9593 | −17.3560 | 59.9994 |
| 2.9165 | 18.8171 | 59.9994 | 8.5657 | 7.3685 | 59.9994 | 54.9916 | −12.6093 | 59.9994 | 53.3018 | −18.0325 | 59.9994 |
| 3.4990 | 19.7575 | 59.9994 | 9.2928 | 7.5819 | 59.9994 | 55.3285 | −13.6633 | 59.9994 | 53.6386 | −18.7118 | 59.9994 |
| 4.1165 | 20.6754 | 59.9994 | 10.0114 | 7.8261 | 59.9994 | 55.6667 | −14.7174 | 59.9994 | 53.9671 | −19.3954 | 59.9994 |
| 4.7636 | 21.5736 | 59.9994 | 10.7244 | 8.0711 | 59.9994 | 56.0050 | −15.7700 | 59.9994 | 54.2843 | −20.0845 | 59.9994 |
| 5.4387 | 22.4508 | 59.9994 | 11.4359 | 8.3482 | 59.9994 | 56.3461 | −16.8227 | 59.9994 | 54.5945 | −20.7764 | 59.9994 |
| 6.1390 | 23.3070 | 59.9994 | 12.1532 | 8.5952 | 59.9994 | 56.6885 | −17.8753 | 59.9994 | 54.8948 | −21.4726 | 59.9994 |
| 6.8619 | 24.1449 | 59.9994 | 12.8760 | 8.8240 | 59.9994 | 57.0296 | −18.9280 | 59.9994 | 55.1910 | −22.1715 | 59.9994 |
| 7.6071 | 24.9632 | 59.9994 | 13.6058 | 9.0317 | 59.9994 | 57.3678 | −19.9820 | 59.9994 | 55.4857 | −22.8705 | 59.9994 |
| 8.3763 | 25.7590 | 59.9994 | 14.3413 | 9.2198 | 59.9994 | 57.7005 | −21.0375 | 59.9994 | 55.7790 | −23.5709 | 59.9994 |
| 9.1678 | 26.5323 | 59.9994 | 15.0795 | 9.3882 | 59.9994 | 58.0275 | −22.0943 | 59.9994 | 56.0724 | −24.2698 | 59.9994 |
| 9.9833 | 27.2804 | 59.9994 | 15.8234 | 9.5370 | 59.9994 | 58.3475 | −23.1540 | 59.9994 | 56.3657 | −24.9688 | 59.9994 |
| 10.8254 | 27.9976 | 59.9994 | 16.5711 | 9.6647 | 59.9994 | 58.6619 | −24.2151 | 59.9994 | 56.6590 | −25.6691 | 59.9994 |
| 11.6942 | 28.6825 | 59.9994 | 17.3223 | 9.7700 | 59.9994 | 58.9707 | −25.2775 | 59.9994 | 56.9510 | −26.3681 | 59.9994 |
| 12.5925 | 29.3309 | 59.9994 | 18.0760 | 9.8528 | 59.9994 | 59.2738 | −26.3428 | 59.9994 | 57.2443 | −27.0685 | 59.9994 |
| 13.5174 | 29.9373 | 59.9994 | 18.8325 | 9.9131 | 59.9994 | 59.3622 | −26.6614 | 59.9994 | 57.3833 | −27.3927 | 59.9994 |
| 14.4732 | 30.4973 | 59.9994 | 19.5905 | 9.9496 | 59.9994 | 59.4591 | −27.0207 | 59.9994 | 57.5433 | −27.7576 | 59.9994 |
| 15.4557 | 31.0053 | 59.9994 | 20.3484 | 9.9622 | 59.9994 | 59.5489 | −27.3800 | 59.9994 | 57.7089 | −28.1197 | 59.9994 |
| 16.4648 | 31.4573 | 59.9994 | 21.1077 | 9.9510 | 59.9994 | 59.6331 | −27.7435 | 59.9994 | 57.8815 | −28.4776 | 59.9994 |
| 17.5006 | 31.8475 | 59.9994 | 21.8656 | 9.9173 | 59.9994 | 59.7075 | −28.1085 | 59.9994 | 58.0710 | −28.8285 | 59.9994 |
| 18.5589 | 32.1731 | 59.9994 | 22.6207 | 9.8584 | 59.9994 | 59.7482 | −28.4776 | 59.9994 | 58.3040 | −29.1513 | 59.9994 |
| 19.6354 | 32.4271 | 59.9994 | 23.3744 | 9.7756 | 59.9994 | 59.7173 | −28.8467 | 59.9994 | 58.6099 | −29.4067 | 59.9994 |
| 20.7273 | 32.6054 | 59.9994 | 24.1253 | 9.6675 | 59.9994 | 59.5952 | −29.1990 | 59.9994 | 58.9791 | −29.5569 | 59.9994 |
| 21.8291 | 32.7050 | 59.9994 | 24.8733 | 9.5356 | 59.9994 | 59.3636 | −29.4853 | 59.9994 | 59.3636 | −29.4853 | 59.9994 |
| 22.9351 | 32.7247 | 59.9994 | 25.6158 | 9.3812 | 59.9994 | 1.6211 | 10.2331 | 69.9996 | 1.6211 | 10.2331 | 69.9996 |
| 24.0396 | 32.6615 | 59.9994 | 26.3527 | 9.2029 | 59.9994 | 1.0681 | 11.1721 | 69.9996 | 2.1460 | 9.6914 | 69.9996 |
| 25.1372 | 32.5169 | 59.9994 | 27.0839 | 9.0008 | 59.9994 | 0.7719 | 12.2233 | 69.9996 | 2.7664 | 9.2591 | 69.9996 |
| 26.2207 | 32.2952 | 59.9994 | 27.8081 | 8.7777 | 59.9994 | 0.6947 | 13.3153 | 69.9996 | 3.4513 | 8.9405 | 69.9996 |
| 27.2874 | 31.9976 | 59.9994 | 28.5253 | 8.5306 | 59.9994 | 0.7832 | 14.4058 | 69.9996 | 4.1769 | 8.7229 | 69.9996 |
| 28.3302 | 31.6299 | 59.9994 | 29.2355 | 8.2640 | 59.9994 | 0.9965 | 15.4795 | 69.9996 | 4.9222 | 8.5910 | 69.9996 |
| 29.3478 | 31.1962 | 59.9994 | 29.9373 | 7.9763 | 59.9994 | 1.3081 | 16.5294 | 69.9996 | 5.6773 | 8.5335 | 69.9996 |
| 30.3387 | 30.7036 | 59.9994 | 30.6306 | 7.6689 | 59.9994 | 1.6983 | 17.5511 | 69.9996 | 6.4338 | 8.5377 | 69.9996 |
| 31.3001 | 30.1548 | 59.9994 | 31.3155 | 7.3419 | 59.9994 | 2.1516 | 18.5476 | 69.9996 | 7.1889 | 8.5952 | 69.9996 |
| 32.2306 | 29.5569 | 59.9994 | 31.9906 | 6.9996 | 59.9994 | 2.6611 | 19.5175 | 69.9996 | 7.9398 | 8.6977 | 69.9996 |
| 33.1317 | 28.9141 | 59.9994 | 32.6573 | 6.6345 | 59.9994 | 3.2169 | 20.4606 | 69.9996 | 8.6822 | 8.8408 | 69.9996 |
| 34.0019 | 28.2306 | 59.9994 | 33.3127 | 6.2541 | 59.9994 | 3.8120 | 21.3785 | 69.9996 | 9.4177 | 9.0219 | 69.9996 |
| 34.8440 | 27.5120 | 59.9994 | 33.9598 | 5.8569 | 59.9994 | 4.4436 | 22.2726 | 69.9996 | 10.1447 | 9.2324 | 69.9996 |
| 35.6552 | 26.7597 | 59.9994 | 34.5970 | 5.4457 | 59.9994 | 5.1074 | 23.1428 | 69.9996 | 10.8647 | 9.4668 | 69.9996 |
| 36.4398 | 25.9793 | 59.9994 | 35.2244 | 5.0190 | 59.9994 | 5.7994 | 23.9919 | 69.9996 | 11.5833 | 9.7040 | 69.9996 |

TABLE I-continued

| SUCTION-SIDE | | | PRESSURE-SIDE | | |
|---|---|---|---|---|---|
| X (%) | Y (%) | Z (%) | X (%) | Y (%) | Z (%) |
| 6.5180 | 24.8172 | 69.9996 | 12.3061 | 9.9314 | 69.9996 |
| 7.2619 | 25.6214 | 69.9996 | 13.0346 | 10.1363 | 69.9996 |
| 8.0282 | 26.4018 | 69.9996 | 13.7686 | 10.3187 | 69.9996 |
| 8.8198 | 27.1583 | 69.9996 | 14.5083 | 10.4801 | 69.9996 |
| 9.6338 | 27.8895 | 69.9996 | 15.2535 | 10.6205 | 69.9996 |
| 10.4745 | 28.5913 | 69.9996 | 16.0016 | 10.7370 | 69.9996 |
| 11.3405 | 29.2608 | 69.9996 | 16.7525 | 10.8310 | 69.9996 |
| 12.2332 | 29.8952 | 69.9996 | 17.5062 | 10.8998 | 69.9996 |
| 13.1539 | 30.4874 | 69.9996 | 18.2613 | 10.9461 | 69.9996 |
| 14.1013 | 31.0334 | 69.9996 | 19.0192 | 10.9658 | 69.9996 |
| 15.0767 | 31.5303 | 69.9996 | 19.7757 | 10.9616 | 69.9996 |
| 16.0788 | 31.9710 | 69.9996 | 20.5322 | 10.9321 | 69.9996 |
| 17.1062 | 32.3499 | 69.9996 | 21.2873 | 10.8759 | 69.9996 |
| 18.1546 | 32.6643 | 69.9996 | 22.0396 | 10.7959 | 69.9996 |
| 19.2213 | 32.9057 | 69.9996 | 22.7891 | 10.6893 | 69.9996 |
| 20.3034 | 33.0699 | 69.9996 | 23.5358 | 10.5587 | 69.9996 |
| 21.3954 | 33.1556 | 69.9996 | 24.2754 | 10.4030 | 69.9996 |
| 22.4901 | 33.1598 | 69.9996 | 25.0109 | 10.2233 | 69.9996 |
| 23.5807 | 33.0812 | 69.9996 | 25.7407 | 10.0198 | 69.9996 |
| 24.6642 | 32.9212 | 69.9996 | 26.4635 | 9.7924 | 69.9996 |
| 25.7323 | 32.6812 | 69.9996 | 27.1779 | 9.5440 | 69.9996 |
| 26.7807 | 32.3668 | 69.9996 | 27.8853 | 9.2717 | 69.9996 |
| 27.8053 | 31.9836 | 69.9996 | 28.5829 | 8.9798 | 69.9996 |
| 28.8032 | 31.5345 | 69.9996 | 29.2734 | 8.6682 | 69.9996 |
| 29.7730 | 31.0264 | 69.9996 | 29.9541 | 8.3370 | 69.9996 |
| 30.7134 | 30.4650 | 69.9996 | 30.6250 | 7.9861 | 69.9996 |
| 31.6229 | 29.8573 | 69.9996 | 31.2861 | 7.6184 | 69.9996 |
| 32.5015 | 29.2046 | 69.9996 | 31.9387 | 7.2338 | 69.9996 |
| 33.3520 | 28.5141 | 69.9996 | 32.5801 | 6.8324 | 69.9996 |
| 34.1717 | 27.7899 | 69.9996 | 33.2131 | 6.4169 | 69.9996 |
| 34.9647 | 27.0348 | 69.9996 | 33.8363 | 5.9860 | 69.9996 |
| 35.7296 | 26.2516 | 69.9996 | 34.4482 | 5.5411 | 69.9996 |
| 36.4679 | 25.4432 | 69.9996 | 35.0517 | 5.0836 | 69.9996 |
| 37.1823 | 24.6137 | 69.9996 | 35.6454 | 4.6134 | 69.9996 |
| 37.8714 | 23.7631 | 69.9996 | 36.2293 | 4.1320 | 69.9996 |
| 38.5381 | 22.8958 | 69.9996 | 36.8033 | 3.6379 | 69.9996 |
| 39.1837 | 22.0115 | 69.9996 | 37.3689 | 3.1355 | 69.9996 |
| 39.8083 | 21.1119 | 69.9996 | 37.9247 | 2.6218 | 69.9996 |
| 40.4146 | 20.2010 | 69.9996 | 38.4721 | 2.0983 | 69.9996 |
| 41.0013 | 19.2761 | 69.9996 | 39.0111 | 1.5663 | 69.9996 |
| 41.5711 | 18.3413 | 69.9996 | 39.5416 | 1.0260 | 69.9996 |
| 42.1241 | 17.3967 | 69.9996 | 40.0637 | 0.4772 | 69.9996 |
| 42.6617 | 16.4437 | 69.9996 | 40.5774 | -0.0786 | 69.9996 |
| 43.1852 | 15.4823 | 69.9996 | 41.0827 | -0.6414 | 69.9996 |
| 43.6946 | 14.5139 | 69.9996 | 41.5809 | -1.2126 | 69.9996 |
| 44.1915 | 13.5384 | 69.9996 | 42.0708 | -1.7895 | 69.9996 |
| 44.6771 | 12.5574 | 69.9996 | 42.5536 | -2.3720 | 69.9996 |
| 45.1515 | 11.5707 | 69.9996 | 43.0294 | -2.9614 | 69.9996 |
| 45.6161 | 10.5784 | 69.9996 | 43.4982 | -3.5565 | 69.9996 |
| 46.0694 | 9.5819 | 69.9996 | 43.9599 | -4.1558 | 69.9996 |
| 46.5143 | 8.5826 | 69.9996 | 44.4147 | -4.7608 | 69.9996 |
| 46.9508 | 7.5777 | 69.9996 | 44.8638 | -5.3713 | 69.9996 |
| 47.3789 | 6.5713 | 69.9996 | 45.3059 | -5.9860 | 69.9996 |
| 47.7986 | 5.5594 | 69.9996 | 45.7410 | -6.6036 | 69.9996 |
| 48.2126 | 4.5460 | 69.9996 | 46.1719 | -7.2268 | 69.9996 |
| 48.6182 | 3.5299 | 69.9996 | 46.5957 | -7.8541 | 69.9996 |
| 49.0168 | 2.5095 | 69.9996 | 47.0140 | -8.4857 | 69.9996 |
| 49.4098 | 1.4877 | 69.9996 | 47.4266 | -9.1201 | 69.9996 |
| 49.7972 | 0.4646 | 69.9996 | 47.8351 | -9.7573 | 69.9996 |
| 50.1775 | -0.5614 | 69.9996 | 48.2365 | -10.4001 | 69.9996 |
| 50.5537 | -1.5902 | 69.9996 | 48.6337 | -11.0444 | 69.9996 |
| 50.9256 | -2.6204 | 69.9996 | 49.0252 | -11.6928 | 69.9996 |
| 51.2919 | -3.6506 | 69.9996 | 49.4112 | -12.3426 | 69.9996 |
| 51.6555 | -4.6836 | 69.9996 | 49.7930 | -12.9967 | 69.9996 |
| 52.0148 | -5.7180 | 69.9996 | 50.1705 | -13.6535 | 69.9996 |
| 52.3685 | -6.7538 | 69.9996 | 50.5439 | -14.3118 | 69.9996 |
| 52.7179 | -7.7910 | 69.9996 | 50.9130 | -14.9728 | 69.9996 |
| 53.0632 | -8.8296 | 69.9996 | 51.2779 | -15.6367 | 69.9996 |
| 53.4029 | -9.8710 | 69.9996 | 51.6372 | -16.3034 | 69.9996 |
| 53.7411 | -10.9110 | 69.9996 | 51.9923 | -16.9715 | 69.9996 |
| 54.0780 | -11.9539 | 69.9996 | 52.3432 | -17.6424 | 69.9996 |
| 54.4162 | -12.9953 | 69.9996 | 52.6871 | -18.3160 | 69.9996 |
| 54.7545 | -14.0353 | 69.9996 | 53.0253 | -18.9940 | 69.9996 |
| 55.0955 | -15.0753 | 69.9996 | 53.3565 | -19.6747 | 69.9996 |
| 55.4366 | -16.1153 | 69.9996 | 53.6793 | -20.3596 | 69.9996 |
| 55.7790 | -17.1553 | 69.9996 | 53.9923 | -21.0487 | 69.9996 |
| 56.1215 | -18.1953 | 69.9996 | 54.2983 | -21.7421 | 69.9996 |
| 56.4625 | -19.2354 | 69.9996 | 54.5987 | -22.4368 | 69.9996 |
| 56.7994 | -20.2768 | 69.9996 | 54.8962 | -23.1330 | 69.9996 |
| 57.1334 | -21.3196 | 69.9996 | 55.1952 | -23.8277 | 69.9996 |
| 57.4619 | -22.3638 | 69.9996 | 55.4955 | -24.5239 | 69.9996 |
| 57.7847 | -23.4095 | 69.9996 | 55.7959 | -25.2186 | 69.9996 |
| 58.1033 | -24.4579 | 69.9996 | 56.0948 | -25.9133 | 69.9996 |
| 58.4135 | -25.5077 | 69.9996 | 56.3952 | -26.6081 | 69.9996 |
| 58.7180 | -26.5590 | 69.9996 | 56.6955 | -27.3028 | 69.9996 |
| 58.8092 | -26.8776 | 69.9996 | 56.8387 | -27.6271 | 69.9996 |
| 58.9089 | -27.2383 | 69.9996 | 57.0043 | -27.9920 | 69.9996 |
| 59.0029 | -27.5990 | 69.9996 | 57.1741 | -28.3541 | 69.9996 |
| 59.0900 | -27.9625 | 69.9996 | 57.3496 | -28.7120 | 69.9996 |
| 59.1685 | -28.3274 | 69.9996 | 57.5433 | -29.0629 | 69.9996 |
| 59.2121 | -28.6979 | 69.9996 | 57.7777 | -29.3857 | 69.9996 |
| 59.1868 | -29.0699 | 69.9996 | 58.0864 | -29.6397 | 69.9996 |
| 59.0703 | -29.4250 | 69.9996 | 58.4570 | -29.7913 | 69.9996 |
| 58.8429 | -29.7155 | 69.9996 | 58.8429 | -29.7155 | 69.9996 |
| 1.7221 | 12.1503 | 79.9997 | 1.7221 | 12.1503 | 79.9997 |
| 1.2197 | 13.1005 | 79.9997 | 2.2162 | 11.5819 | 79.9997 |
| 0.9670 | 14.1476 | 79.9997 | 2.8071 | 11.1145 | 79.9997 |
| 0.9263 | 15.2255 | 79.9997 | 3.4695 | 10.7538 | 79.9997 |
| 1.0484 | 16.2992 | 79.9997 | 4.1783 | 10.4914 | 79.9997 |
| 1.2955 | 17.3504 | 79.9997 | 4.9123 | 10.3145 | 79.9997 |
| 1.6393 | 18.3736 | 79.9997 | 5.6604 | 10.2107 | 79.9997 |
| 2.0604 | 19.3673 | 79.9997 | 6.4141 | 10.1686 | 79.9997 |
| 2.5446 | 20.3315 | 79.9997 | 7.1692 | 10.1784 | 79.9997 |
| 3.0821 | 21.2691 | 79.9997 | 7.9229 | 10.2289 | 79.9997 |
| 3.6646 | 22.1772 | 79.9997 | 8.6738 | 10.3159 | 79.9997 |
| 4.2878 | 23.0600 | 79.9997 | 9.4177 | 10.4366 | 79.9997 |
| 4.9488 | 23.9133 | 79.9997 | 10.1573 | 10.5896 | 79.9997 |
| 5.6422 | 24.7414 | 79.9997 | 10.8914 | 10.7679 | 79.9997 |
| 6.3664 | 25.5414 | 79.9997 | 11.6240 | 10.9545 | 79.9997 |
| 7.1187 | 26.3148 | 79.9997 | 12.3567 | 11.1342 | 79.9997 |
| 7.8977 | 27.0628 | 79.9997 | 13.0949 | 11.2956 | 79.9997 |
| 8.7019 | 27.7842 | 79.9997 | 13.8360 | 11.4345 | 79.9997 |
| 9.5286 | 28.4776 | 79.9997 | 14.5827 | 11.5496 | 79.9997 |
| 10.3805 | 29.1415 | 79.9997 | 15.3321 | 11.6423 | 79.9997 |
| 11.2563 | 29.7730 | 79.9997 | 16.0844 | 11.7096 | 79.9997 |
| 12.1574 | 30.3681 | 79.9997 | 16.8381 | 11.7531 | 79.9997 |
| 13.0823 | 30.9239 | 79.9997 | 17.5932 | 11.7728 | 79.9997 |
| 14.0339 | 31.4362 | 79.9997 | 18.3483 | 11.7686 | 79.9997 |
| 15.0079 | 31.8994 | 79.9997 | 19.1034 | 11.7377 | 79.9997 |
| 16.0072 | 32.3106 | 79.9997 | 19.8557 | 11.6830 | 79.9997 |
| 17.0262 | 32.6643 | 79.9997 | 20.6066 | 11.6016 | 79.9997 |
| 18.0662 | 32.9548 | 79.9997 | 21.3547 | 11.4949 | 79.9997 |
| 19.1231 | 33.1738 | 79.9997 | 22.0986 | 11.3644 | 79.9997 |
| 20.1926 | 33.3184 | 79.9997 | 22.8368 | 11.2100 | 79.9997 |
| 21.2705 | 33.3857 | 79.9997 | 23.5709 | 11.0303 | 79.9997 |
| 22.3498 | 33.3717 | 79.9997 | 24.2979 | 10.8282 | 79.9997 |
| 23.4249 | 33.2777 | 79.9997 | 25.0193 | 10.6023 | 79.9997 |
| 24.4902 | 33.1036 | 79.9997 | 25.7323 | 10.3538 | 79.9997 |
| 25.5400 | 32.8524 | 79.9997 | 26.4369 | 10.0844 | 79.9997 |
| 26.5702 | 32.5282 | 79.9997 | 27.1344 | 9.7938 | 79.9997 |
| 27.5765 | 32.1366 | 79.9997 | 27.8235 | 9.4836 | 79.9997 |
| 28.5548 | 31.6818 | 79.9997 | 28.5029 | 9.1538 | 79.9997 |
| 29.5050 | 31.1696 | 79.9997 | 29.1723 | 8.8057 | 79.9997 |
| 30.4271 | 30.6067 | 79.9997 | 29.8334 | 8.4394 | 79.9997 |
| 31.3169 | 29.9962 | 79.9997 | 30.4846 | 8.0577 | 79.9997 |
| 32.1787 | 29.3450 | 79.9997 | 31.1261 | 7.6591 | 79.9997 |
| 33.0096 | 28.6558 | 79.9997 | 31.7576 | 7.2464 | 79.9997 |
| 33.8124 | 27.9344 | 79.9997 | 32.3808 | 6.8183 | 79.9997 |
| 34.5886 | 27.1835 | 79.9997 | 32.9927 | 6.3762 | 79.9997 |
| 35.3366 | 26.4046 | 79.9997 | 33.5963 | 5.9229 | 79.9997 |
| 36.0595 | 25.6032 | 79.9997 | 34.1900 | 5.4555 | 79.9997 |
| 36.7584 | 24.7793 | 79.9997 | 34.7738 | 4.9783 | 79.9997 |
| 37.4321 | 23.9372 | 79.9997 | 35.3493 | 4.4885 | 79.9997 |
| 38.0847 | 23.0768 | 79.9997 | 35.9163 | 3.9888 | 79.9997 |
| 38.7163 | 22.1996 | 79.9997 | 36.4735 | 3.4793 | 79.9997 |
| 39.3269 | 21.3098 | 79.9997 | 37.0223 | 2.9600 | 79.9997 |
| 39.9192 | 20.4073 | 79.9997 | 37.5626 | 2.4323 | 79.9997 |
| 40.4932 | 19.4922 | 79.9997 | 38.0932 | 1.8962 | 79.9997 |
| 41.0504 | 18.5673 | 79.9997 | 38.6181 | 1.3530 | 79.9997 |
| 41.5922 | 17.6339 | 79.9997 | 39.1332 | 0.8014 | 79.9997 |
| 42.1171 | 16.6908 | 79.9997 | 39.6413 | 0.2428 | 79.9997 |
| 42.6294 | 15.7406 | 79.9997 | 40.1423 | -0.3228 | 79.9997 |

TABLE I-continued

| SUCTION-SIDE | | | PRESSURE-SIDE | | | SUCTION-SIDE | | | PRESSURE-SIDE | | |
|---|---|---|---|---|---|---|---|---|---|---|---|
| X (%) | Y (%) | Z (%) | X (%) | Y (%) | Z (%) | X (%) | Y (%) | Z (%) | X (%) | Y (%) | Z (%) |
| 43.1276 | 14.7820 | 79.9997 | 40.6350 | −0.8955 | 79.9997 | 16.6908 | 34.1549 | 89.9999 | 20.0803 | 13.6633 | 89.9999 |
| 43.6132 | 13.8177 | 79.9997 | 41.1220 | −1.4737 | 79.9997 | 17.7322 | 34.3766 | 89.9999 | 20.8354 | 13.5342 | 89.9999 |
| 44.0876 | 12.8479 | 79.9997 | 41.6006 | −2.0576 | 79.9997 | 18.7904 | 34.5086 | 89.9999 | 21.5863 | 13.3770 | 89.9999 |
| 44.5508 | 11.8724 | 79.9997 | 42.0722 | −2.6457 | 79.9997 | 19.8557 | 34.5521 | 89.9999 | 22.3301 | 13.1946 | 89.9999 |
| 45.0041 | 10.8928 | 79.9997 | 42.5381 | −3.2407 | 79.9997 | 20.9196 | 34.5057 | 89.9999 | 23.0684 | 12.9854 | 89.9999 |
| 45.4477 | 9.9075 | 79.9997 | 42.9971 | −3.8401 | 79.9997 | 21.9779 | 34.3738 | 89.9999 | 23.7982 | 12.7497 | 89.9999 |
| 45.8813 | 8.9194 | 79.9997 | 43.4490 | −4.4450 | 79.9997 | 23.0207 | 34.1563 | 89.9999 | 24.5196 | 12.4914 | 89.9999 |
| 46.3066 | 7.9271 | 79.9997 | 43.8954 | −5.0541 | 79.9997 | 24.0452 | 33.8615 | 89.9999 | 25.2326 | 12.2093 | 89.9999 |
| 46.7249 | 6.9320 | 79.9997 | 44.3361 | −5.6674 | 79.9997 | 25.0460 | 33.4938 | 89.9999 | 25.9358 | 11.9047 | 89.9999 |
| 47.1347 | 5.9327 | 79.9997 | 44.7712 | −6.2850 | 79.9997 | 26.0200 | 33.0601 | 89.9999 | 26.6305 | 11.5791 | 89.9999 |
| 47.5375 | 4.9306 | 79.9997 | 45.2006 | −6.9054 | 79.9997 | 26.9660 | 32.5689 | 89.9999 | 27.3141 | 11.2338 | 89.9999 |
| 47.9347 | 3.9271 | 79.9997 | 45.6245 | −7.5313 | 79.9997 | 27.8825 | 32.0243 | 89.9999 | 27.9892 | 10.8689 | 89.9999 |
| 48.3249 | 2.9207 | 79.9997 | 46.0442 | −8.1587 | 79.9997 | 28.7695 | 31.4334 | 89.9999 | 28.6530 | 10.4858 | 89.9999 |
| 48.7095 | 1.9116 | 79.9997 | 46.4568 | −8.7917 | 79.9997 | 29.6285 | 30.8018 | 89.9999 | 29.3071 | 10.0858 | 89.9999 |
| 49.0884 | 0.9011 | 79.9997 | 46.8652 | −9.4261 | 79.9997 | 30.4594 | 30.1338 | 89.9999 | 29.9499 | 9.6703 | 89.9999 |
| 49.4617 | −0.1123 | 79.9997 | 47.2680 | −10.0647 | 79.9997 | 31.2636 | 29.4334 | 89.9999 | 30.5843 | 9.2380 | 89.9999 |
| 49.8309 | −1.1270 | 79.9997 | 47.6666 | −10.7075 | 79.9997 | 32.0412 | 28.7050 | 89.9999 | 31.2075 | 8.7931 | 89.9999 |
| 50.1958 | −2.1432 | 79.9997 | 48.0596 | −11.3517 | 79.9997 | 32.7948 | 27.9499 | 89.9999 | 31.8208 | 8.3327 | 89.9999 |
| 50.5551 | −3.1621 | 79.9997 | 48.4484 | −11.9988 | 79.9997 | 33.5247 | 27.1737 | 89.9999 | 32.4257 | 7.8612 | 89.9999 |
| 50.9116 | −4.1811 | 79.9997 | 48.8330 | −12.6486 | 79.9997 | 34.2335 | 26.3765 | 89.9999 | 33.0194 | 7.3769 | 89.9999 |
| 51.2625 | −5.2015 | 79.9997 | 49.2133 | −13.3012 | 79.9997 | 34.9198 | 25.5611 | 89.9999 | 33.6033 | 6.8801 | 89.9999 |
| 51.6105 | −6.2232 | 79.9997 | 49.5895 | −13.9567 | 79.9997 | 35.5879 | 24.7302 | 89.9999 | 34.1787 | 6.3734 | 89.9999 |
| 51.9544 | −7.2478 | 79.9997 | 49.9614 | −14.6135 | 79.9997 | 36.2349 | 23.8824 | 89.9999 | 34.7458 | 5.8569 | 89.9999 |
| 52.2955 | −8.2724 | 79.9997 | 50.3291 | −15.2732 | 79.9997 | 36.8651 | 23.0235 | 89.9999 | 35.3030 | 5.3306 | 89.9999 |
| 52.6309 | −9.2984 | 79.9997 | 50.6940 | −15.9343 | 79.9997 | 37.4770 | 22.1505 | 89.9999 | 35.8517 | 4.7959 | 89.9999 |
| 52.9636 | −10.3258 | 79.9997 | 51.0548 | −16.5981 | 79.9997 | 38.0735 | 21.2663 | 89.9999 | 36.3921 | 4.2513 | 89.9999 |
| 53.2948 | −11.3531 | 79.9997 | 51.4098 | −17.2634 | 79.9997 | 38.6546 | 20.3722 | 89.9999 | 36.9240 | 3.6997 | 89.9999 |
| 53.6246 | −12.3805 | 79.9997 | 51.7607 | −17.9329 | 79.9997 | 39.2216 | 19.4697 | 89.9999 | 37.4489 | 3.1411 | 89.9999 |
| 53.9558 | −13.4093 | 79.9997 | 52.1074 | −18.6038 | 79.9997 | 39.7746 | 18.5575 | 89.9999 | 37.9640 | 2.5741 | 89.9999 |
| 54.2871 | −14.4367 | 79.9997 | 52.4471 | −19.2775 | 79.9997 | 40.3135 | 17.6381 | 89.9999 | 38.4735 | 2.0000 | 89.9999 |
| 54.6197 | −15.4641 | 79.9997 | 52.7797 | −19.9554 | 79.9997 | 40.8413 | 16.7118 | 89.9999 | 38.9746 | 1.4204 | 89.9999 |
| 54.9538 | −16.4901 | 79.9997 | 53.1039 | −20.6375 | 79.9997 | 41.3564 | 15.7785 | 89.9999 | 39.4686 | 0.8337 | 89.9999 |
| 55.2892 | −17.5160 | 79.9997 | 53.4211 | −21.3238 | 79.9997 | 41.8616 | 14.8395 | 89.9999 | 39.9556 | 0.2414 | 89.9999 |
| 55.6246 | −18.5434 | 79.9997 | 53.7299 | −22.0129 | 79.9997 | 42.3571 | 13.8963 | 89.9999 | 40.4357 | −0.3565 | 89.9999 |
| 55.9587 | −19.5694 | 79.9997 | 54.0330 | −22.7035 | 79.9997 | 42.8427 | 12.9461 | 89.9999 | 40.9086 | −0.9586 | 89.9999 |
| 56.2913 | −20.5968 | 79.9997 | 54.3348 | −23.3968 | 79.9997 | 43.3185 | 11.9932 | 89.9999 | 41.3760 | −1.5677 | 89.9999 |
| 56.6197 | −21.6256 | 79.9997 | 54.6366 | −24.0888 | 79.9997 | 43.7873 | 11.0345 | 89.9999 | 41.8364 | −2.1797 | 89.9999 |
| 56.9440 | −22.6558 | 79.9997 | 54.9441 | −24.7793 | 79.9997 | 44.2462 | 10.0731 | 89.9999 | 42.2911 | −2.7972 | 89.9999 |
| 57.2626 | −23.6873 | 79.9997 | 55.2457 | −25.4712 | 79.9997 | 44.6996 | 9.1075 | 89.9999 | 42.7388 | −3.4190 | 89.9999 |
| 57.5755 | −24.7203 | 79.9997 | 55.5503 | −26.1618 | 79.9997 | 45.1431 | 8.1391 | 89.9999 | 43.1810 | −4.0450 | 89.9999 |
| 57.8815 | −25.7562 | 79.9997 | 55.8548 | −26.8523 | 79.9997 | 45.5810 | 7.1664 | 89.9999 | 43.6175 | −4.6752 | 89.9999 |
| 58.1805 | −26.7934 | 79.9997 | 56.1608 | −27.5428 | 79.9997 | 46.0105 | 6.1910 | 89.9999 | 44.0497 | −5.3095 | 89.9999 |
| 58.2703 | −27.1092 | 79.9997 | 56.3039 | −27.8628 | 79.9997 | 46.4329 | 5.2113 | 89.9999 | 44.4750 | −5.9468 | 89.9999 |
| 58.3699 | −27.4656 | 79.9997 | 56.4710 | −28.2236 | 79.9997 | 46.8484 | 4.2302 | 89.9999 | 44.8947 | −6.5882 | 89.9999 |
| 58.4626 | −27.8235 | 79.9997 | 56.6408 | −28.5801 | 79.9997 | 47.2568 | 3.2450 | 89.9999 | 45.3101 | −7.2324 | 89.9999 |
| 58.5496 | −28.1829 | 79.9997 | 56.8176 | −28.9337 | 79.9997 | 47.6596 | 2.2583 | 89.9999 | 45.7213 | −7.8794 | 89.9999 |
| 58.6268 | −28.5450 | 79.9997 | 57.0113 | −29.2790 | 79.9997 | 48.0554 | 1.2688 | 89.9999 | 46.1256 | −8.5306 | 89.9999 |
| 58.6717 | −28.9113 | 79.9997 | 57.2457 | −29.5962 | 79.9997 | 48.4456 | 0.2765 | 89.9999 | 46.5270 | −9.1847 | 89.9999 |
| 58.6450 | −29.2790 | 79.9997 | 57.5531 | −29.8474 | 79.9997 | 48.8316 | −0.7172 | 89.9999 | 46.9214 | −9.8415 | 89.9999 |
| 58.5285 | −29.6299 | 79.9997 | 57.9208 | −29.9934 | 79.9997 | 49.2119 | −1.7137 | 89.9999 | 47.3129 | −10.5012 | 89.9999 |
| 58.3026 | −29.9176 | 79.9997 | 58.3026 | −29.9176 | 79.9997 | 49.5867 | −2.7116 | 89.9999 | 47.6989 | −11.1637 | 89.9999 |
| 1.8162 | 14.7932 | 89.9999 | 1.8162 | 14.7932 | 89.9999 | 49.9558 | −3.7123 | 89.9999 | 48.0807 | −11.8275 | 89.9999 |
| 1.3698 | 15.7560 | 89.9999 | 2.2835 | 14.1883 | 89.9999 | 50.3221 | −4.7130 | 89.9999 | 48.4582 | −12.4956 | 89.9999 |
| 1.1649 | 16.8002 | 89.9999 | 2.8534 | 13.6774 | 89.9999 | 50.6814 | −5.7166 | 89.9999 | 48.8316 | −13.1651 | 89.9999 |
| 1.1691 | 17.8655 | 89.9999 | 3.5004 | 13.2676 | 89.9999 | 51.0379 | −6.7215 | 89.9999 | 49.1993 | −13.8374 | 89.9999 |
| 1.3319 | 18.9196 | 89.9999 | 4.1994 | 12.9504 | 89.9999 | 51.3888 | −7.7278 | 89.9999 | 49.5642 | −14.5111 | 89.9999 |
| 1.6183 | 19.9455 | 89.9999 | 4.9292 | 12.7160 | 89.9999 | 51.7369 | −8.7356 | 89.9999 | 49.9263 | −15.1876 | 89.9999 |
| 2.0014 | 20.9406 | 89.9999 | 5.6773 | 12.5518 | 89.9999 | 52.0793 | −9.7461 | 89.9999 | 50.2828 | −15.8655 | 89.9999 |
| 2.4618 | 21.9021 | 89.9999 | 6.4380 | 12.4535 | 89.9999 | 52.4190 | −10.7566 | 89.9999 | 50.6365 | −16.5462 | 89.9999 |
| 2.9867 | 22.8298 | 89.9999 | 7.2029 | 12.4156 | 89.9999 | 52.7558 | −11.7672 | 89.9999 | 50.9846 | −17.2283 | 89.9999 |
| 3.5664 | 23.7252 | 89.9999 | 7.9692 | 12.4367 | 89.9999 | 53.0913 | −12.7791 | 89.9999 | 51.3298 | −17.9132 | 89.9999 |
| 4.1923 | 24.5870 | 89.9999 | 8.7328 | 12.5111 | 89.9999 | 53.4253 | −13.7925 | 89.9999 | 51.6681 | −18.6010 | 89.9999 |
| 4.8576 | 25.4207 | 89.9999 | 9.4893 | 12.6346 | 89.9999 | 53.7594 | −14.8044 | 89.9999 | 52.0007 | −19.2915 | 89.9999 |
| 5.5538 | 26.2277 | 89.9999 | 10.2373 | 12.7974 | 89.9999 | 54.0934 | −15.8164 | 89.9999 | 52.3278 | −19.9862 | 89.9999 |
| 6.2752 | 27.0123 | 89.9999 | 10.9798 | 12.9897 | 89.9999 | 54.4288 | −16.8283 | 89.9999 | 52.6449 | −20.6838 | 89.9999 |
| 7.0176 | 27.7772 | 89.9999 | 11.7209 | 13.1890 | 89.9999 | 54.7657 | −17.8403 | 89.9999 | 52.9537 | −21.3856 | 89.9999 |
| 7.7784 | 28.5253 | 89.9999 | 12.4647 | 13.3728 | 89.9999 | 55.1025 | −18.8522 | 89.9999 | 53.2555 | −22.0901 | 89.9999 |
| 8.5545 | 29.2551 | 89.9999 | 13.2142 | 13.5300 | 89.9999 | 55.4380 | −19.8641 | 89.9999 | 53.5502 | −22.7975 | 89.9999 |
| 9.3503 | 29.9667 | 89.9999 | 13.9707 | 13.6605 | 89.9999 | 55.7720 | −20.8761 | 89.9999 | 53.8450 | −23.5049 | 89.9999 |
| 10.1658 | 30.6517 | 89.9999 | 14.7300 | 13.7602 | 89.9999 | 56.1018 | −21.8894 | 89.9999 | 54.1397 | −24.2123 | 89.9999 |
| 11.0079 | 31.3057 | 89.9999 | 15.4936 | 13.8332 | 89.9999 | 56.4247 | −22.9056 | 89.9999 | 54.4359 | −24.9196 | 89.9999 |
| 11.8781 | 31.9219 | 89.9999 | 16.2585 | 13.8781 | 89.9999 | 56.7390 | −23.9245 | 89.9999 | 54.7334 | −25.6270 | 89.9999 |
| 12.7791 | 32.4917 | 89.9999 | 17.0248 | 13.8921 | 89.9999 | 57.0464 | −24.9463 | 89.9999 | 55.0295 | −26.3330 | 89.9999 |
| 13.7125 | 33.0082 | 89.9999 | 17.7911 | 13.8795 | 89.9999 | 57.3482 | −25.9681 | 89.9999 | 55.3257 | −27.0404 | 89.9999 |
| 14.6753 | 33.4629 | 89.9999 | 18.5575 | 13.8360 | 89.9999 | 57.6429 | −26.9927 | 89.9999 | 55.6232 | −27.7478 | 89.9999 |
| 15.6690 | 33.8475 | 89.9999 | 19.3210 | 13.7644 | 89.9999 | 57.7327 | −27.3099 | 89.9999 | 55.7622 | −28.0720 | 89.9999 |

TABLE I-continued

| SUCTION-SIDE | | | PRESSURE-SIDE | | |
|---|---|---|---|---|---|
| X (%) | Y (%) | Z (%) | X (%) | Y (%) | Z (%) |
| 57.8310 | −27.6692 | 89.9999 | 55.9236 | −28.4369 | 89.9999 |
| 57.9236 | −28.0285 | 89.9999 | 56.0906 | −28.7976 | 89.9999 |
| 58.0092 | −28.3906 | 89.9999 | 56.2661 | −29.1541 | 89.9999 |
| 58.0836 | −28.7541 | 89.9999 | 56.4555 | −29.5050 | 89.9999 |
| 58.1229 | −29.1246 | 89.9999 | 56.6913 | −29.8264 | 89.9999 |
| 58.0963 | −29.4952 | 89.9999 | 57.0001 | −30.0790 | 89.9999 |
| 57.9798 | −29.8502 | 89.9999 | 57.3734 | −30.2236 | 89.9999 |
| 57.7552 | −30.1366 | 89.9999 | 57.7552 | −30.1366 | 89.9999 |
| 1.8920 | 20.9168 | 100.0000 | 1.8920 | 20.9168 | 100.0000 |
| 1.5074 | 21.9329 | 100.0000 | 2.3130 | 20.2684 | 100.0000 |
| 1.3684 | 23.0123 | 100.0000 | 2.8435 | 19.7069 | 100.0000 |
| 1.4330 | 24.1000 | 100.0000 | 3.4611 | 19.2424 | 100.0000 |
| 1.6562 | 25.1681 | 100.0000 | 4.1404 | 18.8732 | 100.0000 |
| 2.0000 | 26.2025 | 100.0000 | 4.8590 | 18.5883 | 100.0000 |
| 2.4379 | 27.2018 | 100.0000 | 5.6029 | 18.3792 | 100.0000 |
| 2.9502 | 28.1646 | 100.0000 | 6.3622 | 18.2346 | 100.0000 |
| 3.5229 | 29.0923 | 100.0000 | 7.1271 | 18.1196 | 100.0000 |
| 4.1488 | 29.9864 | 100.0000 | 7.8934 | 18.0115 | 100.0000 |
| 4.8169 | 30.8496 | 100.0000 | 8.6598 | 17.9104 | 100.0000 |
| 5.5243 | 31.6790 | 100.0000 | 9.4275 | 17.8136 | 100.0000 |
| 6.2752 | 32.4706 | 100.0000 | 10.1938 | 17.7181 | 100.0000 |
| 7.0780 | 33.2075 | 100.0000 | 10.9616 | 17.6213 | 100.0000 |
| 7.9327 | 33.8854 | 100.0000 | 11.7279 | 17.5174 | 100.0000 |
| 8.8338 | 34.5001 | 100.0000 | 12.4928 | 17.4038 | 100.0000 |
| 9.7728 | 35.0545 | 100.0000 | 13.2549 | 17.2732 | 100.0000 |
| 10.7454 | 35.5486 | 100.0000 | 14.0156 | 17.1287 | 100.0000 |
| 11.7461 | 35.9823 | 100.0000 | 14.7721 | 16.9673 | 100.0000 |
| 12.7693 | 36.3584 | 100.0000 | 15.5244 | 16.7918 | 100.0000 |
| 13.8121 | 36.6798 | 100.0000 | 16.2739 | 16.6009 | 100.0000 |
| 14.8690 | 36.9479 | 100.0000 | 17.0192 | 16.3960 | 100.0000 |
| 15.9371 | 37.1668 | 100.0000 | 17.7602 | 16.1729 | 100.0000 |
| 17.0150 | 37.3395 | 100.0000 | 18.4971 | 15.9357 | 100.0000 |
| 18.0971 | 37.4700 | 100.0000 | 19.2269 | 15.6830 | 100.0000 |
| 19.1848 | 37.5612 | 100.0000 | 19.9526 | 15.4150 | 100.0000 |
| 20.2740 | 37.6146 | 100.0000 | 20.6726 | 15.1328 | 100.0000 |
| 21.3645 | 37.6244 | 100.0000 | 21.3856 | 14.8339 | 100.0000 |
| 22.4536 | 37.5753 | 100.0000 | 22.0929 | 14.5195 | 100.0000 |
| 23.5386 | 37.4574 | 100.0000 | 22.7933 | 14.1911 | 100.0000 |
| 24.6137 | 37.2735 | 100.0000 | 23.4866 | 13.8486 | 100.0000 |
| 25.6747 | 37.0223 | 100.0000 | 24.1716 | 13.4907 | 100.0000 |
| 26.7176 | 36.7037 | 100.0000 | 24.8495 | 13.1174 | 100.0000 |
| 27.7379 | 36.3191 | 100.0000 | 25.5190 | 12.7314 | 100.0000 |
| 28.7330 | 35.8728 | 100.0000 | 26.1814 | 12.3314 | 100.0000 |
| 29.7001 | 35.3689 | 100.0000 | 26.8355 | 11.9188 | 100.0000 |
| 30.6376 | 34.8103 | 100.0000 | 27.4811 | 11.4921 | 100.0000 |
| 31.5415 | 34.2012 | 100.0000 | 28.1183 | 11.0542 | 100.0000 |
| 32.4145 | 33.5457 | 100.0000 | 28.7457 | 10.6037 | 100.0000 |
| 33.2552 | 32.8510 | 100.0000 | 29.3660 | 10.1405 | 100.0000 |
| 34.0622 | 32.1169 | 100.0000 | 29.9766 | 9.6661 | 100.0000 |
| 34.8384 | 31.3506 | 100.0000 | 30.5787 | 9.1805 | 100.0000 |
| 35.5837 | 30.5548 | 100.0000 | 31.1724 | 8.6850 | 100.0000 |
| 36.2995 | 29.7309 | 100.0000 | 31.7576 | 8.1798 | 100.0000 |
| 36.9858 | 28.8846 | 100.0000 | 32.3345 | 7.6647 | 100.0000 |
| 37.6468 | 28.0158 | 100.0000 | 32.9029 | 7.1397 | 100.0000 |
| 38.2812 | 27.1288 | 100.0000 | 33.4629 | 6.6064 | 100.0000 |
| 38.8932 | 26.2263 | 100.0000 | 34.0145 | 6.0632 | 100.0000 |
| 39.4813 | 25.3070 | 100.0000 | 34.5577 | 5.5131 | 100.0000 |
| 40.0483 | 24.3765 | 100.0000 | 35.0938 | 4.9559 | 100.0000 |
| 40.5957 | 23.4319 | 100.0000 | 35.6201 | 4.3902 | 100.0000 |
| 41.1248 | 22.4775 | 100.0000 | 36.1409 | 3.8176 | 100.0000 |
| 41.6357 | 21.5147 | 100.0000 | 36.6531 | 3.2393 | 100.0000 |
| 42.1283 | 20.5420 | 100.0000 | 37.1584 | 2.6527 | 100.0000 |
| 42.6069 | 19.5610 | 100.0000 | 37.6567 | 2.0618 | 100.0000 |
| 43.0687 | 18.5729 | 100.0000 | 38.1479 | 1.4639 | 100.0000 |
| 43.5178 | 17.5792 | 100.0000 | 38.6321 | 0.8618 | 100.0000 |
| 43.9529 | 16.5785 | 100.0000 | 39.1107 | 0.2526 | 100.0000 |
| 44.3740 | 15.5721 | 100.0000 | 39.5809 | −0.3607 | 100.0000 |
| 44.7824 | 14.5602 | 100.0000 | 40.0469 | −0.9783 | 100.0000 |
| 45.1782 | 13.5440 | 100.0000 | 40.5058 | −1.6000 | 100.0000 |
| 45.5627 | 12.5237 | 100.0000 | 40.9592 | −2.2274 | 100.0000 |
| 45.9375 | 11.4991 | 100.0000 | 41.4055 | −2.8576 | 100.0000 |
| 46.3010 | 10.4717 | 100.0000 | 41.8476 | −3.4934 | 100.0000 |
| 46.6575 | 9.4401 | 100.0000 | 42.2841 | −4.1306 | 100.0000 |
| 47.0070 | 8.4071 | 100.0000 | 42.7150 | −4.7734 | 100.0000 |
| 47.3508 | 7.3713 | 100.0000 | 43.1417 | −5.4190 | 100.0000 |
| 47.6877 | 6.3341 | 100.0000 | 43.5627 | −6.0675 | 100.0000 |
| 48.0217 | 5.2955 | 100.0000 | 43.9796 | −6.7187 | 100.0000 |
| 48.3516 | 4.2555 | 100.0000 | 44.3922 | −7.3727 | 100.0000 |
| 48.6772 | 3.2155 | 100.0000 | 44.8006 | −8.0296 | 100.0000 |
| 49.0014 | 2.1741 | 100.0000 | 45.2034 | −8.6892 | 100.0000 |
| 49.3200 | 1.1312 | 100.0000 | 45.6034 | −9.3517 | 100.0000 |
| 49.6372 | 0.0870 | 100.0000 | 45.9992 | −10.0156 | 100.0000 |
| 49.9516 | −0.9572 | 100.0000 | 46.3908 | −10.6823 | 100.0000 |
| 50.2618 | −2.0028 | 100.0000 | 46.7796 | −11.3517 | 100.0000 |
| 50.5691 | −3.0499 | 100.0000 | 47.1642 | −12.0226 | 100.0000 |
| 50.8737 | −4.0969 | 100.0000 | 47.5459 | −12.6949 | 100.0000 |
| 51.1741 | −5.1453 | 100.0000 | 47.9249 | −13.3700 | 100.0000 |
| 51.4730 | −6.1952 | 100.0000 | 48.2996 | −14.0465 | 100.0000 |
| 51.7663 | −7.2450 | 100.0000 | 48.6716 | −14.7244 | 100.0000 |
| 52.0583 | −8.2963 | 100.0000 | 49.0393 | −15.4037 | 100.0000 |
| 52.3474 | −9.3489 | 100.0000 | 49.4056 | −16.0844 | 100.0000 |
| 52.6351 | −10.4001 | 100.0000 | 49.7705 | −16.7680 | 100.0000 |
| 52.9214 | −11.4528 | 100.0000 | 50.1326 | −17.4515 | 100.0000 |
| 53.2064 | −12.5054 | 100.0000 | 50.4905 | −18.1364 | 100.0000 |
| 53.4927 | −13.5581 | 100.0000 | 50.8442 | −18.8241 | 100.0000 |
| 53.7804 | −14.6107 | 100.0000 | 51.1923 | −19.5147 | 100.0000 |
| 54.0695 | −15.6620 | 100.0000 | 51.5334 | −20.2080 | 100.0000 |
| 54.3615 | −16.7132 | 100.0000 | 51.8688 | −20.9056 | 100.0000 |
| 54.6548 | −17.7645 | 100.0000 | 52.1972 | −21.6059 | 100.0000 |
| 54.9495 | −18.8143 | 100.0000 | 52.5200 | −22.3077 | 100.0000 |
| 55.2415 | −19.8655 | 100.0000 | 52.8400 | −23.0123 | 100.0000 |
| 55.5306 | −20.9168 | 100.0000 | 53.1600 | −23.7168 | 100.0000 |
| 55.8155 | −21.9694 | 100.0000 | 53.4786 | −24.4214 | 100.0000 |
| 56.0962 | −23.0235 | 100.0000 | 53.8001 | −25.1246 | 100.0000 |
| 56.3741 | −24.0789 | 100.0000 | 54.1243 | −25.8277 | 100.0000 |
| 56.6464 | −25.1344 | 100.0000 | 54.4513 | −26.5281 | 100.0000 |
| 56.9061 | −26.1941 | 100.0000 | 54.7825 | −27.2270 | 100.0000 |
| 57.1601 | −27.2551 | 100.0000 | 55.1152 | −27.9246 | 100.0000 |
| 57.2359 | −27.5681 | 100.0000 | 55.2625 | −28.2334 | 100.0000 |
| 57.3201 | −27.9204 | 100.0000 | 55.4281 | −28.5815 | 100.0000 |
| 57.4015 | −28.2741 | 100.0000 | 55.5966 | −28.9267 | 100.0000 |
| 57.4773 | −28.6278 | 100.0000 | 55.7692 | −29.2706 | 100.0000 |
| 57.5461 | −28.9843 | 100.0000 | 55.9559 | −29.6074 | 100.0000 |
| 57.5840 | −29.3436 | 100.0000 | 56.1776 | −29.9190 | 100.0000 |
| 57.5517 | −29.7043 | 100.0000 | 56.4654 | −30.1731 | 100.0000 |
| 57.4268 | −30.0439 | 100.0000 | 56.8106 | −30.3415 | 100.0000 |
| 57.1882 | −30.3106 | 100.0000 | 57.1882 | −30.3106 | 100.0000 |

TABLE II

| SUCTION-SIDE | | | PRESSURE-SIDE | | |
|---|---|---|---|---|---|
| X(%) | Y(%) | Z(%) | X(%) | Y(%) | Z(%) |
| 62.4640 | −25.0726 | 0.0000 | 60.4542 | −25.8530 | 0.0000 |
| 62.5623 | −25.3870 | 0.0000 | 60.6030 | −26.1730 | 0.0000 |
| 62.6704 | −25.7421 | 0.0000 | 60.7742 | −26.5309 | 0.0000 |
| 62.7728 | −26.1000 | 0.0000 | 60.9496 | −26.8860 | 0.0000 |
| 62.8668 | −26.4579 | 0.0000 | 61.1335 | −27.2369 | 0.0000 |
| 62.9511 | −26.8200 | 0.0000 | 61.3328 | −27.5807 | 0.0000 |
| 63.0016 | −27.1878 | 0.0000 | 61.5756 | −27.8937 | 0.0000 |
| 62.9805 | −27.5569 | 0.0000 | 61.8886 | −28.1379 | 0.0000 |
| 62.8668 | −27.9092 | 0.0000 | 62.2591 | −28.2783 | 0.0000 |
| 62.6409 | −28.1997 | 0.0000 | 62.6409 | −28.1997 | 0.0000 |
| 61.9433 | −25.2804 | 10.0001 | 59.9236 | −26.0326 | 10.0001 |
| 62.0374 | −25.5961 | 10.0001 | 60.0682 | −26.3541 | 10.0001 |
| 62.1412 | −25.9526 | 10.0001 | 60.2338 | −26.7148 | 10.0001 |
| 62.2381 | −26.3105 | 10.0001 | 60.4051 | −27.0713 | 10.0001 |
| 62.3265 | −26.6698 | 10.0001 | 60.5833 | −27.4249 | 10.0001 |
| 62.4065 | −27.0320 | 10.0001 | 60.7784 | −27.7702 | 10.0001 |
| 62.4514 | −27.3997 | 10.0001 | 61.0156 | −28.0860 | 10.0001 |
| 62.4261 | −27.7688 | 10.0001 | 61.3258 | −28.3344 | 10.0001 |
| 62.3068 | −28.1197 | 10.0001 | 61.6935 | −28.4790 | 10.0001 |
| 62.0767 | −28.4046 | 10.0001 | 62.0767 | −28.4046 | 10.0001 |
| 61.4268 | −25.4965 | 20.0003 | 59.3987 | −26.2221 | 20.0003 |
| 61.5167 | −25.8123 | 20.0003 | 59.5377 | −26.5435 | 20.0003 |
| 61.6149 | −26.1674 | 20.0003 | 59.6977 | −26.9042 | 20.0003 |
| 61.7061 | −26.5239 | 20.0003 | 59.8633 | −27.2607 | 20.0003 |
| 61.7903 | −26.8832 | 20.0003 | 60.0373 | −27.6144 | 20.0003 |

TABLE II-continued

| SUCTION-SIDE | | | PRESSURE-SIDE | | |
|---|---|---|---|---|---|
| X(%) | Y(%) | Z(%) | X(%) | Y(%) | Z(%) |
| 61.8647 | −27.2439 | 20.0003 | 60.2268 | −27.9597 | 20.0003 |
| 61.9040 | −27.6102 | 20.0003 | 60.4612 | −28.2755 | 20.0003 |
| 61.8717 | −27.9765 | 20.0003 | 60.7658 | −28.5253 | 20.0003 |
| 61.7468 | −28.3232 | 20.0003 | 61.1321 | −28.6713 | 20.0003 |
| 61.5124 | −28.6025 | 20.0003 | 61.5124 | −28.6025 | 20.0003 |
| 60.9103 | −25.7183 | 30.0004 | 58.8724 | −26.4214 | 30.0004 |
| 60.9959 | −26.0312 | 30.0004 | 59.0071 | −26.7428 | 30.0004 |
| 61.0886 | −26.3849 | 30.0004 | 59.1629 | −27.1007 | 30.0004 |
| 61.1756 | −26.7400 | 30.0004 | 59.3243 | −27.4572 | 30.0004 |
| 61.2542 | −27.0979 | 30.0004 | 59.4942 | −27.8081 | 30.0004 |
| 61.3244 | −27.4572 | 30.0004 | 59.6808 | −28.1534 | 30.0004 |
| 61.3581 | −27.8207 | 30.0004 | 59.9096 | −28.4678 | 30.0004 |
| 61.3202 | −28.1829 | 30.0004 | 60.2114 | −28.7162 | 30.0004 |
| 61.1896 | −28.5253 | 30.0004 | 60.5735 | −28.8636 | 30.0004 |
| 60.9524 | −28.7990 | 30.0004 | 60.9524 | −28.7990 | 30.0004 |
| 60.3812 | −25.9344 | 40.0006 | 58.3419 | −26.6291 | 40.0006 |
| 60.4654 | −26.2474 | 40.0006 | 58.4738 | −26.9492 | 40.0006 |
| 60.5552 | −26.6011 | 40.0006 | 58.6268 | −27.3085 | 40.0006 |
| 60.6409 | −26.9562 | 40.0006 | 58.7868 | −27.6635 | 40.0006 |
| 60.7180 | −27.3127 | 40.0006 | 58.9538 | −28.0158 | 40.0006 |
| 60.7840 | −27.6706 | 40.0006 | 59.1377 | −28.3597 | 40.0006 |
| 60.8163 | −28.0341 | 40.0006 | 59.3664 | −28.6755 | 40.0006 |
| 60.7756 | −28.3962 | 40.0006 | 59.6668 | −28.9239 | 40.0006 |
| 60.6437 | −28.7358 | 40.0006 | 60.0275 | −29.0699 | 40.0006 |
| 60.4051 | −29.0067 | 40.0006 | 60.4051 | −29.0067 | 40.0006 |
| 59.8338 | −26.1407 | 49.9993 | 57.7973 | −26.8453 | 49.9993 |
| 59.9180 | −26.4565 | 49.9993 | 57.9306 | −27.1681 | 49.9993 |
| 60.0107 | −26.8116 | 49.9993 | 58.0864 | −27.5288 | 49.9993 |
| 60.0977 | −27.1695 | 49.9993 | 58.2478 | −27.8867 | 49.9993 |
| 60.1763 | −27.5274 | 49.9993 | 58.4163 | −28.2418 | 49.9993 |
| 60.2465 | −27.8881 | 49.9993 | 58.6029 | −28.5885 | 49.9993 |
| 60.2801 | −28.2544 | 49.9993 | 58.8317 | −28.9071 | 49.9993 |
| 60.2437 | −28.6193 | 49.9993 | 59.1349 | −29.1583 | 49.9993 |
| 60.1145 | −28.9632 | 49.9993 | 59.4984 | −29.3071 | 49.9993 |
| 59.8787 | −29.2397 | 49.9993 | 59.8787 | −29.2397 | 49.9993 |
| 59.2738 | −26.3428 | 59.9994 | 57.2443 | −27.0685 | 59.9994 |
| 59.3622 | −26.6614 | 59.9994 | 57.3833 | −27.3927 | 59.9994 |
| 59.4591 | −27.0207 | 59.9994 | 57.5433 | −27.7576 | 59.9994 |
| 59.5489 | −27.3800 | 59.9994 | 57.7089 | −28.1197 | 59.9994 |
| 59.6331 | −27.7435 | 59.9994 | 57.8815 | −28.4776 | 59.9994 |
| 59.7075 | −28.1085 | 59.9994 | 58.0710 | −28.8285 | 59.9994 |
| 59.7482 | −28.4776 | 59.9994 | 58.3040 | −29.1513 | 59.9994 |
| 59.7173 | −28.8467 | 59.9994 | 58.6099 | −29.4067 | 59.9994 |
| 59.5952 | −29.1990 | 59.9994 | 58.9791 | −29.5569 | 59.9994 |
| 59.3636 | −29.4853 | 59.9994 | 59.3636 | −29.4853 | 59.9994 |
| 58.7180 | −26.5590 | 69.9996 | 56.6955 | −27.3028 | 69.9996 |
| 58.8092 | −26.8776 | 69.9996 | 56.8387 | −27.6271 | 69.9996 |
| 58.9089 | −27.2383 | 69.9996 | 57.0043 | −27.9920 | 69.9996 |
| 59.0029 | −27.5990 | 69.9996 | 57.1741 | −28.3541 | 69.9996 |
| 59.0900 | −27.9625 | 69.9996 | 57.3496 | −28.7120 | 69.9996 |
| 59.1685 | −28.3274 | 69.9996 | 57.5433 | −29.0629 | 69.9996 |
| 59.2121 | −28.6979 | 69.9996 | 57.7777 | −29.3857 | 69.9996 |
| 59.1868 | −29.0699 | 69.9996 | 58.0864 | −29.6397 | 69.9996 |
| 59.0703 | −29.4250 | 69.9996 | 58.4570 | −29.7913 | 69.9996 |
| 58.8429 | −29.7155 | 69.9996 | 58.8429 | −29.7155 | 69.9996 |
| 58.1805 | −26.7934 | 79.9997 | 56.1608 | −27.5428 | 79.9997 |
| 58.2703 | −27.1092 | 79.9997 | 56.3039 | −27.8628 | 79.9997 |
| 58.3699 | −27.4656 | 79.9997 | 56.4710 | −28.2236 | 79.9997 |
| 58.4626 | −27.8235 | 79.9997 | 56.6408 | −28.5801 | 79.9997 |
| 58.5496 | −28.1829 | 79.9997 | 56.8176 | −28.9337 | 79.9997 |
| 58.6268 | −28.5450 | 79.9997 | 57.0113 | −29.2790 | 79.9997 |
| 58.6717 | −28.9113 | 79.9997 | 57.2457 | −29.5962 | 79.9997 |
| 58.6450 | −29.2790 | 79.9997 | 57.5531 | −29.8474 | 79.9997 |
| 58.5285 | −29.6299 | 79.9997 | 57.9208 | −29.9934 | 79.9997 |
| 58.3026 | −29.9176 | 79.9997 | 58.3026 | −29.9176 | 79.9997 |
| 57.6429 | −26.9927 | 89.9999 | 55.6232 | −27.7478 | 89.9999 |
| 57.7327 | −27.3099 | 89.9999 | 55.7622 | −28.0720 | 89.9999 |
| 57.8310 | −27.6692 | 89.9999 | 55.9236 | −28.4369 | 89.9999 |
| 57.9236 | −28.0285 | 89.9999 | 56.0906 | −28.7976 | 89.9999 |
| 58.0092 | −28.3906 | 89.9999 | 56.2661 | −29.1541 | 89.9999 |
| 58.0836 | −28.7541 | 89.9999 | 56.4555 | −29.5050 | 89.9999 |
| 58.1229 | −29.1246 | 89.9999 | 56.6913 | −29.8264 | 89.9999 |
| 58.0963 | −29.4952 | 89.9999 | 57.0001 | −30.0790 | 89.9999 |
| 57.9798 | −29.8502 | 89.9999 | 57.3734 | −30.2236 | 89.9999 |
| 57.7552 | −30.1366 | 89.9999 | 57.7552 | −30.1366 | 89.9999 |
| 57.1601 | −27.2551 | 100.0000 | 55.1152 | −27.9246 | 100.0000 |
| 57.2359 | −27.5681 | 100.0000 | 55.2625 | −28.2334 | 100.0000 |
| 57.3201 | −27.9204 | 100.0000 | 55.4281 | −28.5815 | 100.0000 |
| 57.4015 | −28.2741 | 100.0000 | 55.5966 | −28.9267 | 100.0000 |
| 57.4773 | −28.6278 | 100.0000 | 55.7692 | −29.2706 | 100.0000 |
| 57.5461 | −28.9843 | 100.0000 | 55.9559 | −29.6074 | 100.0000 |
| 57.5840 | −29.3436 | 100.0000 | 56.1776 | −29.9190 | 100.0000 |
| 57.5517 | −29.7043 | 100.0000 | 56.4654 | −30.1731 | 100.0000 |
| 57.4268 | −30.0439 | 100.0000 | 56.8106 | −30.3415 | 100.0000 |
| 57.1882 | −30.3106 | 100.0000 | 57.1882 | −30.3106 | 100.0000 |

It will also be appreciated that the airfoil 52 disclosed in the above Table I and the trailing edge profile 61 disclosed in Table II above may be scaled up or down geometrically for use in other similar turbine designs. Consequently, the coordinate values set forth in Table I or Table II may be scaled upwardly or downwardly such that the airfoil profile shape or trailing edge profile remains unchanged. A scaled version of the coordinates in Table I and/or Table II would be represented by X, Y and Z coordinate values of Table I and/or Table II, with the X, Y and Z non-dimensional coordinate values converted to units of distance (e.g., inches), multiplied or divided by a constant number.

An important term in this disclosure is "profile". The profile is the range of the variation between measured points on an airfoil surface and the ideal position listed in Table I and Table II. The actual profile on a manufactured turbine rotor blade will be different than those in Table I, and the design is robust to this variation meaning that mechanical and aerodynamic function are not impaired. Similarly, the actual profile of the trailing edge on a manufactured turbine rotor blade will be different than those in Table II, and the design is robust to this variation meaning that mechanical and aerodynamic function are not impaired. As noted above, a + or −5% profile tolerance is used herein. The X, Y and Z values are all non-dimensionalized relative to the airfoil height.

The disclosed airfoil shape and the associated trailing edge profile optimizes and is specific to the machine conditions and specifications. It provides a unique profile to achieve 1) interaction between other stages in the turbine 10; 2) aerodynamic efficiency; and 3) normalized aerodynamic and mechanical blade loadings. The disclosed loci of points defined in Table I and/or Table II allow the gas turbine 12 or any other suitable turbine to run in an efficient, safe and smooth manner. As also noted, the disclosed airfoil 52 may be adapted to any scale, as long as 1) interaction between other stages in the pressure turbine 10; 2) aerodynamic efficiency; and 3) normalized aerodynamic and mechanical blade loadings are maintained in the scaled turbine.

The airfoil 52 described herein thus improves overall gas turbine 12 efficiency. Specifically, the airfoil 52 provides a desired turbine efficiency lapse rate (ISO, hot, cold, part load, etc.). The airfoil 52 also meets all aeromechanical and stress requirements. The turbine rotor blade 50 described herein has very specific aerodynamic design requirements, such as an upstream bucket radial back pressure (i.e., work splits) and radial velocity triangles for the downstream turbine rotors 150, 250, 350 and 450. Significant cross-functional design effort was required to meet these design goals. The airfoil 52 of the turbine rotor blade 50 thus is of a specific shape to meet aerodynamic, mechanical, and heat transfer requirements in an efficient and cost-effective manner.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they have structural elements that do not differ from the literal language of the claims or if they include equivalent structural elements with insubstantial differences from the literal languages of the claims.

What is claimed is:

1. A turbine rotor blade comprising an airfoil having an airfoil shape, the airfoil shape having a nominal profile substantially in accordance with Cartesian coordinate values of X, Y and Z set forth in Table I, wherein the Cartesian coordinate values of X, Y and Z are non-dimensional values from 0% to 100% convertible to dimensional distances expressed in a unit of distance by multiplying the Cartesian coordinate values of X, Y and Z by a height of the airfoil in the unit of distance; and wherein X and Y values, when connected by smooth continuing arcs, define airfoil profile sections at each Z value, the airfoil profile sections at Z values being joined smoothly with one another to form a complete airfoil shape.

2. The turbine rotor blade of claim 1, wherein the turbine rotor blade forms part of a stage of a turbine.

3. The turbine rotor blade of claim 1, wherein the turbine rotor blade is a first stage turbine rotor blade.

4. The turbine rotor blade of claim 1, wherein the airfoil shape lies in an envelope within at least one of +/−5% and/or +/−5% of a chord length in a direction normal to any airfoil surface location.

5. The turbine rotor blade of claim 1, wherein the height of the airfoil is about 1 inch to about 10 inches.

6. The turbine rotor blade of claim 1, wherein the X, Y and Z values are scalable as a function of the same constant or number to provide a scaled-up or scaled-down airfoil.

7. A turbine rotor blade comprising an airfoil having an uncoated nominal suction-side profile substantially in accordance with suction-side Cartesian coordinate values of X, Y and Z set forth in Table I, wherein the Cartesian coordinate values of X, Y and Z are non-dimensional values from 0% to 100% convertible to dimensional distances expressed in a unit of distance by multiplying the Cartesian coordinate values of X, Y and Z by a height of the airfoil in the unit of distance; and wherein X and Y values, when connected by smooth continuing arcs, define suction-side profile sections at each Z value, the suction-side profile sections at the Z values being joined smoothly with one another to form a complete airfoil suction-side shape.

8. The turbine rotor blade of claim 7, wherein the turbine rotor blade forms part of a stage of a turbine.

9. The turbine rotor blade of claim 7, wherein the turbine rotor blade is a first stage turbine rotor blade.

10. The turbine rotor blade of claim 7, wherein the suction-side shape lies in an envelope within at least one of +/−5% and/or +/−5% of a chord length in a direction normal to any airfoil surface location.

11. The turbine rotor blade of claim 7, wherein the height of the airfoil is about 1 inch to about 10 inches.

12. The turbine rotor blade of claim 7, wherein the X, Y and Z values are scalable as a function of the same constant or number to provide a scaled-up or scaled-down airfoil with the complete airfoil suction-side shape.

13. A turbine rotor blade comprising an airfoil having an uncoated nominal trailing edge profile substantially in accordance with Cartesian coordinate values of X, Y and Z set forth in Table II, wherein the Cartesian coordinate values of X, Y and Z are non-dimensional values from 0% to 100% convertible to dimensional distances expressed in a unit of distance by multiplying the Cartesian coordinate values of X, Y and Z by a height of the airfoil in the unit of distance; and wherein X and Y values, when connected by smooth continuing arcs, define trailing edge profile sections at each Z value, the trailing edge profile sections at the Z values being joined smoothly with one another to form a complete trailing edge shape of the airfoil.

14. The turbine rotor blade of claim 13, wherein the turbine rotor blade forms part of a stage of a turbine.

15. The turbine rotor blade of claim 13, wherein the turbine rotor blade is a first stage turbine rotor blade.

16. The turbine rotor blade of claim 13, wherein the trailing edge shape lies in an envelope within at least one of +/−5% and/or +/−5% of a chord length in a direction normal to any airfoil surface location.

17. The turbine rotor blade of claim 13, wherein the height of the airfoil is about 1 inch to about 10 inches.

18. The turbine rotor blade of claim 13, wherein the X, Y and Z values are scalable as a function of the same constant or number to provide a scaled-up or scaled-down airfoil with the nominal trailing edge profile.

19. The turbine rotor blade of claim 13, wherein X represents a distance parallel to a turbine axis of rotation.

* * * * *